(12) United States Patent
Humphrey

(10) Patent No.: US 12,327,484 B2
(45) Date of Patent: Jun. 10, 2025

(54) SYNCHRONIZED AUDIOVISUAL WORK

(71) Applicant: JAMMIT, INC., Hollywood, CA (US)

(72) Inventor: Scott Humphrey, Hollywood, CA (US)

(73) Assignee: JAMMIT, INC., Hollywood, CA (US)

(*) Notice: Subject to any disclaimer, the term of this patent is extended or adjusted under 35 U.S.C. 154(b) by 0 days.

(21) Appl. No.: 17/747,853

(22) Filed: May 18, 2022

(65) Prior Publication Data

US 2022/0277661 A1 Sep. 1, 2022

Related U.S. Application Data

(63) Continuation of application No. 16/862,131, filed on Apr. 29, 2020, now Pat. No. 11,361,671, which is a
(Continued)

(51) Int. Cl.
| | | |
|---|---|---|
| *G09B 15/00* | (2006.01) | |
| *G06Q 50/00* | (2024.01) | |
| *G10H 1/00* | (2006.01) | |

(52) U.S. Cl.
CPC ............. *G09B 15/00* (2013.01); *G06Q 50/00* (2013.01); *G10H 1/0041* (2013.01);
(Continued)

(58) Field of Classification Search
CPC ...... G09B 15/00; G06Q 50/00; G10H 1/0041; G10H 1/0066; G10H 2210/056; G10H 2210/061; G10H 2210/385; G10H 2220/015; G10H 2220/091; G10H 2220/135; G10H 2240/005
See application file for complete search history.

(56) References Cited

U.S. PATENT DOCUMENTS

| | | |
|---|---|---|
| 4,030,397 A | 6/1977 | Nelson |
| 4,264,845 A | 4/1981 | Bednarz |

(Continued)

FOREIGN PATENT DOCUMENTS

| | | |
|---|---|---|
| JP | 2002-333881 | 5/2001 |
| JP | 2002-341877 | 5/2001 |

(Continued)

OTHER PUBLICATIONS

Kan et al., LyricAlly: Automatic Synchronization of Textual Lyrics to Acoustic Music Signals, Feb. 1, 2008, IEEE Transactions on Audio, Speech, and Language Processing, vol. 16, No. 2, p. 338-349 (Year: 2008).*

(Continued)

*Primary Examiner* — Jianchun Qin
(74) *Attorney, Agent, or Firm* — Brian S. Boyer; SYNDICATED LAW, PC

(57) ABSTRACT

The teachings described herein are generally directed to a system, method, and apparatus for separating and mixing tracks within music. The system can have a video that is synchronized with the variations in the musical tempo through a variable timing reference track designed and provided for a user of the preselected performance that was prerecorded, wherein the designing of the variable timing reference track includes creating a tempo map having variable tempos, rhythms, and beats using notes from the preselected performance.

16 Claims, 17 Drawing Sheets

Related U.S. Application Data continuation of application No. 16/229,973, filed on Dec. 21, 2018, now Pat. No. 10,679,515, which is a continuation of application No. 15/446,428, filed on Mar. 1, 2017, now Pat. No. 10,192,460, which is a continuation of application No. 15/062,165, filed on Mar. 6, 2016, now Pat. No. 9,626,877, which is a continuation of application No. 13/886,269, filed on May 2, 2013, now Pat. No. 9,311,824, which is a continuation of application No. 13/115,937, filed on May 25, 2011, now Pat. No. 8,476,517, which is a continuation of application No. 13/023,485, filed on Feb. 8, 2011, now Pat. No. 8,207,438, which is a continuation of application No. 12/390,393, filed on Feb. 20, 2009, now Pat. No. 7,902,446.

(60) Provisional application No. 61/030,174, filed on Feb. 20, 2008.

(52) U.S. Cl.
CPC ..... *G10H 1/0066* (2013.01); *G10H 2210/056* (2013.01); *G10H 2210/061* (2013.01); *G10H 2210/385* (2013.01); *G10H 2220/015* (2013.01); *G10H 2220/091* (2013.01); *G10H 2220/135* (2013.01); *G10H 2240/005* (2013.01)

(56) References Cited

U.S. PATENT DOCUMENTS

| | | | |
|---|---|---|---|
| 4,658,690 | A | 4/1987 | Aitken et al. |
| D289,900 | S | 5/1987 | Aitken et al. |
| 4,870,325 | A | 9/1989 | Kazar |
| 5,008,595 | A | 4/1991 | Kazar |
| 5,100,985 | A | 3/1992 | Allen |
| 5,315,911 | A | 5/1994 | Ochi |
| 5,525,062 | A | 6/1996 | Ogawa et al. |
| 5,533,903 | A | 7/1996 | Kennedy |
| 5,557,056 | A | 9/1996 | Hong et al. |
| 5,569,038 | A | 10/1996 | Tubman et al. |
| 5,585,583 | A | 12/1996 | Owen |
| 5,627,335 | A | 5/1997 | Rigopulos et al. |
| 5,690,496 | A | 11/1997 | Kennedy |
| 5,715,179 | A | 2/1998 | Park |
| 5,725,931 | A | 3/1998 | Landin et al. |
| 5,739,457 | A | 4/1998 | Devecka |
| 5,763,804 | A | 6/1998 | Rigopulos et al. |
| 5,820,384 | A | 10/1998 | Tubman et al. |
| 5,906,464 | A | 5/1999 | Wedenig |
| 6,005,180 | A | 12/1999 | Masuda |
| 6,011,212 | A | 1/2000 | Rigopulos et al. |
| 6,066,791 | A | 5/2000 | Renard et al. |
| 6,201,174 | B1 | 3/2001 | Eller |
| 6,287,124 | B1 | 9/2001 | Yamaura et al. |
| 6,353,170 | B1 | 3/2002 | Eyzaguirre et al. |
| 6,353,174 | B1 | 3/2002 | Schmidt et al. |
| 6,379,244 | B1 | 4/2002 | Sagawa et al. |
| 6,388,181 | B2 | 5/2002 | Moe |
| 6,429,863 | B1 | 8/2002 | LoPiccolo et al. |
| 6,482,087 | B1 | 11/2002 | Egozy et al. |
| 6,541,692 | B2 | 4/2003 | Miller |
| 6,555,737 | B2 | 4/2003 | Miyaki et al. |
| 6,639,138 | B1 | 10/2003 | Hester |
| 6,660,922 | B1 | 12/2003 | Roeder |
| 6,686,531 | B1 | 2/2004 | Pennock et al. |
| 6,740,803 | B2 | 5/2004 | Brinkman et al. |
| 6,751,439 | B2 | 6/2004 | Tice et al. |
| 6,924,425 | B2 | 8/2005 | Naples et al. |
| 6,969,797 | B2 | 11/2005 | Brinkman et al. |
| 7,030,311 | B2 | 4/2006 | Brinkman et al. |
| 7,081,580 | B2 | 7/2006 | Brinkman et al. |
| 7,129,407 | B2 | 10/2006 | Hiratsuka et al. |
| 7,141,733 | B2 | 11/2006 | Fujishima et al. |
| 7,164,076 | B2 | 1/2007 | McHale et al. |
| 7,191,023 | B2 | 3/2007 | Williams |
| 7,199,298 | B2 | 4/2007 | Funaki |
| 7,320,643 | B1 | 1/2008 | Brosius et al. |
| 7,345,236 | B2 | 3/2008 | Worrall et al. |
| 7,430,454 | B2 | 9/2008 | Ota et al. |
| 7,459,624 | B2 | 12/2008 | Schmidt et al. |
| 7,518,057 | B2 | 4/2009 | Worrall et al. |
| 7,525,036 | B2 | 4/2009 | Shotwell et al. |
| 7,576,279 | B2 | 8/2009 | Tohgi et al. |
| 7,625,284 | B2 | 12/2009 | Kay et al. |
| 7,683,250 | B2 | 3/2010 | Ikeya et al. |
| 7,709,725 | B2 | 5/2010 | Toledano et al. |
| 7,714,222 | B2 | 5/2010 | Taub et al. |
| 7,758,427 | B2 | 7/2010 | Egozy |
| 7,772,480 | B2 | 8/2010 | Brennan |
| 7,777,110 | B2 | 8/2010 | Wallis |
| 7,851,689 | B2 | 12/2010 | Reynolds et al. |
| 7,893,337 | B2 | 2/2011 | Lenz |
| 7,902,446 | B2 | 3/2011 | Humphrey |
| 7,906,720 | B2 | 3/2011 | Delorme |
| 7,910,818 | B2 | 3/2011 | Kim et al. |
| 7,923,620 | B2 | 4/2011 | Foster |
| 8,044,289 | B2 | 10/2011 | Toledano et al. |
| 8,046,688 | B2 * | 10/2011 | Adams .................. G11B 27/34 715/835 |
| 8,079,907 | B2 | 12/2011 | Egozy |
| 8,111,241 | B2 | 2/2012 | Weinberg et al. |
| 8,119,896 | B1 | 2/2012 | Smith |
| 8,138,409 | B2 | 3/2012 | Brennan |
| 8,170,239 | B2 | 5/2012 | Bailey et al. |
| 8,173,883 | B2 | 5/2012 | Willacy et al. |
| 8,183,454 | B2 | 5/2012 | Luedecke et al. |
| 8,207,438 | B2 | 6/2012 | Humphrey |
| 8,209,623 | B2 | 6/2012 | Barletta |
| 8,269,093 | B2 | 9/2012 | Naik et al. |
| 8,278,534 | B2 | 10/2012 | Hellewell |
| 8,278,543 | B2 | 10/2012 | Humphrey |
| 8,278,544 | B2 | 10/2012 | Humphrey |
| 8,283,545 | B2 | 10/2012 | Humphrey |
| 8,283,547 | B2 | 10/2012 | Villa et al. |
| 8,319,084 | B2 | 11/2012 | Humphrey |
| 8,338,684 | B2 | 12/2012 | Pillhofer et al. |
| 8,347,210 | B2 | 1/2013 | Ubillos et al. |
| 8,367,923 | B2 | 2/2013 | Humphrey |
| 8,444,486 | B2 | 5/2013 | Kay et al. |
| 8,476,517 | B2 | 7/2013 | Humphrey |
| 8,481,838 | B1 | 7/2013 | Smith |
| 8,481,839 | B2 | 7/2013 | Shaffer et al. |
| 8,502,055 | B2 | 8/2013 | Delorme |
| 8,525,012 | B1 | 9/2013 | Yang |
| 8,562,403 | B2 | 10/2013 | Boch et al. |
| 8,779,265 | B1 | 7/2014 | Gottlieb |
| 8,847,053 | B2 | 9/2014 | Humphrey |
| 9,033,795 | B2 | 5/2015 | Yum |
| 9,106,804 | B2 | 8/2015 | Roberts et al. |
| 9,138,652 | B1 | 9/2015 | Thompson et al. |
| 9,183,887 | B2 * | 11/2015 | Barry .................. G11B 27/34 |
| 9,205,333 | B2 | 12/2015 | Tönnqvist |
| 9,275,617 | B2 | 3/2016 | Regnier |
| 9,280,313 | B2 | 3/2016 | Ball et al. |
| 9,311,824 | B2 | 4/2016 | Humphrey |
| 9,440,152 | B2 | 9/2016 | Thompson |
| 9,521,375 | B2 | 12/2016 | Beaumier et al. |
| 9,626,877 | B2 | 4/2017 | Humphrey |
| 9,761,151 | B2 | 9/2017 | Humphrey |
| 9,782,670 | B2 | 10/2017 | Törnqvist |
| 9,798,974 | B2 | 10/2017 | Ball et al. |
| 9,857,934 | B2 | 1/2018 | Humphrey |
| 9,959,779 | B2 | 5/2018 | Humphrey |
| 9,981,193 | B2 | 5/2018 | Adams et al. |
| 10,134,296 | B2 | 11/2018 | Anderson et al. |
| 10,170,017 | B2 | 1/2019 | Humphrey |
| 10,192,460 | B2 | 1/2019 | Humphrey |
| 10,290,291 | B2 | 5/2019 | Tsuda et al. |
| 10,679,515 | B2 | 6/2020 | Humphrey |
| 10,722,802 | B2 | 7/2020 | Hingorani |
| 10,789,924 | B2 | 9/2020 | Humphrey |

(56) References Cited

U.S. PATENT DOCUMENTS

| | | | |
|---|---|---|---|
| 10,878,718 | B2 | 12/2020 | Mora et al. |
| 10,929,092 | B1 | 2/2021 | Karroll, Jr et al. |
| 10,964,299 | B1 | 3/2021 | Estes et al. |
| 11,004,435 | B2 | 5/2021 | Humphrey |
| 11,037,538 | B2 | 6/2021 | Estes et al. |
| 11,081,019 | B2 | 8/2021 | Humphrey |
| 11,282,486 | B2 | 3/2022 | Humphrey |
| 11,361,671 | B2 | 6/2022 | Humphrey |
| 2001/0015123 | A1 | 8/2001 | Nishitani et al. |
| 2002/0188364 | A1 | 12/2002 | Ota et al. |
| 2003/0014262 | A1 | 1/2003 | Kim |
| 2003/0164084 | A1 | 9/2003 | Redmann et al. |
| 2004/0093236 | A1 | 5/2004 | Chacker |
| 2004/0244564 | A1 | 12/2004 | McGregor |
| 2005/0120866 | A1 | 6/2005 | Brinkman et al. |
| 2005/0165657 | A1 | 7/2005 | Aichroth et al. |
| 2005/0255914 | A1 | 11/2005 | McHale |
| 2006/0247046 | A1 | 1/2006 | Choi et al. |
| 2006/0075882 | A1 | 4/2006 | Ikeya et al. |
| 2006/0134590 | A1 | 6/2006 | Huffman et al. |
| 2006/0283310 | A1 | 12/2006 | Bicker |
| 2007/0039449 | A1 | 2/2007 | Redmann |
| 2007/0044643 | A1 | 3/2007 | Huffman |
| 2007/0256543 | A1 | 11/2007 | Evans |
| 2008/0011149 | A1* | 1/2008 | Eastwood ............... G10H 1/40 84/611 |
| 2008/0113797 | A1 | 5/2008 | Egozy |
| 2008/0208692 | A1 | 8/2008 | Garaventi et al. |
| 2008/0245215 | A1* | 10/2008 | Kobayashi ............. G10H 1/383 84/661 |
| 2008/0260184 | A1 | 10/2008 | Baily et al. |
| 2009/0019990 | A1 | 1/2009 | Chien et al. |
| 2009/0027338 | A1 | 1/2009 | Weinberg et al. |
| 2009/0038467 | A1 | 2/2009 | Brennan |
| 2009/0038468 | A1 | 2/2009 | Brennan |
| 2009/0049979 | A1* | 2/2009 | Naik ....................... G10H 1/40 84/636 |
| 2009/0164902 | A1 | 6/2009 | Cohen et al. |
| 2009/0178544 | A1 | 7/2009 | Reynolds et al. |
| 2010/0089221 | A1 | 4/2010 | Miller |
| 2010/0095829 | A1 | 4/2010 | Edwards |
| 2010/0162878 | A1 | 7/2010 | Lengeling et al. |
| 2010/0162880 | A1 | 7/2010 | Luedecke et al. |
| 2010/0218664 | A1 | 9/2010 | Toledano et al. |
| 2010/0233661 | A1 | 9/2010 | Franzblau |
| 2010/0326256 | A1 | 12/2010 | Emmerson |
| 2011/0003638 | A1 | 1/2011 | Lee et al. |
| 2011/0011241 | A1 | 1/2011 | Bartos |
| 2011/0053131 | A1 | 3/2011 | Regnier et al. |
| 2011/0146476 | A1 | 6/2011 | Zimmerman |
| 2011/0259176 | A1 | 10/2011 | Pillhofer et al. |
| 2011/0283866 | A1 | 11/2011 | Hogan |
| 2012/0047077 | A1 | 2/2012 | Humphrey |
| 2012/0057842 | A1 | 3/2012 | Caligor et al. |
| 2012/0174738 | A1 | 7/2012 | Kim |
| 2013/0068086 | A1 | 3/2013 | Mittelstad et al. |
| 2013/0163963 | A1 | 6/2013 | Crosland et al. |
| 2013/0233152 | A1 | 9/2013 | Pillhofer et al. |
| 2014/0040119 | A1 | 2/2014 | Emmerson |
| 2014/0067701 | A1 | 3/2014 | Humphrey |
| 2016/0078853 | A1 | 3/2016 | Gonczi et al. |
| 2017/0337912 | A1 | 4/2017 | Caligor et al. |
| 2018/0174559 | A1 | 6/2018 | Elson |
| 2018/0204599 | A1 | 7/2018 | Garrett et al. |
| 2018/0204600 | A1 | 7/2018 | Garrett et al. |
| 2018/0204601 | A1 | 7/2018 | Garrett et al. |
| 2018/0205999 | A1 | 7/2018 | Garrett et al. |
| 2019/0215540 | A1 | 7/2019 | Nicol et al. |
| 2022/0130273 | A1 | 4/2022 | Humphrey et al. |
| 2022/0254324 | A1 | 8/2022 | Humphrey et al. |

FOREIGN PATENT DOCUMENTS

| | | |
|---|---|---|
| JP | 2003-015657 | 6/2001 |
| JP | 2006-106641 | 4/2006 |
| JP | 2010-518459 | 2/2007 |
| KR | 10-0368599 | 1/2003 |
| WO | WO 2006/017612 | 2/2006 |
| WO | WO 2006/067451 | 6/2006 |
| WO | WO 2007/115299 | 10/2007 |
| WO | WO 2009/105259 | 8/2009 |
| WO | WO 2012/026920 | 3/2012 |
| WO | WO 2012/051605 | 4/2012 |
| WO | WO 2014/204875 | 12/2014 |

OTHER PUBLICATIONS

U.S. Appl. No. 61/455,176 Published in U.S. Pat. No. 8,847,053, filed Oct. 15, 2010, Humphrey—owned by Applicant.

U.S. Appl. No. 61/835,591 Published in US 2015/0046824, filed Jun. 16, 2013, Humphrey—owned by Applicant.

International Search Report for PCT/US2009/001105, Jun. 25, 2009, OEM, Incorporated—owned by Applicant.

International Preliminary Report on Patentability for PCT/US2009/001105, Sep. 2, 2001, OEM, Incorporated—owned by Applicant.

International Search Report for PCT/US2010/046395, Apr. 27, 2011, The Public Record—owned by Applicant International Search Report for PCT/US2011/056485, Jul. 18, 2012, OEM, Incorporated—owned by Applicant International Search Report for PCT/US2014/042596, Jun. 16, 2014, OEM, Incorporated—owned by Applicant European search report for EP 09713651.9, Dec. 15, 2010, Jammi—owned by Applicant.

European search report for EP19210131.9, Apr. 15, 2020, Jammit—owned by Applicant.

Alfred Music Publishing, Alfred introduces new jazz play-along series for improvisation [online] URL: http://www.alfred.com/Company/News/NewJazzPlay-AlongSeries.aspx [retrieved on Dec. 14, 2010].

Behind the Player, Interactive music video [online] URL: http://www.behindtheplayer.com/ [retrieved on Dec. 14, 2010].

CNET News, Java-based MMOG RuneScape goes HD [online] URL: http://news.cnet.com/8301-17939_109-9990066-2.html [retrieved on Dec. 14, 2010].

EJamming Audiio, Now play and record together live with musicians anywhere in the world [online] URL: http://ejamming.com/learn-more/ [retrieved on Dec. 14, 2010].

Groove Maker, Multi-touch groove and beat remix app [online] URL: http://www.groovemaker.com/home/ [retrieved on Dec. 14, 2010].

Guitar Edge, The hottest artists, the coolest gear, the best tab [online] URL: http://www.guitaredge.com/ [retrieved on Dec. 14, 2010].

Guitar Hero, [online] URL: http://hub.guitarhero.com/ [retrieved on Dec. 14, 2010].

guitar instructor.com, [online] URL: http://www.guitarinstructor.com/support/supportAboutGI.jsp [retrieved on Dec. 14, 2010].

Guitar Pro 5 XP-002589192. Arobas Music. [online] URL: http://www.guitar-pro.com/ (Nov. 2005) [retrieved on Jan. 30, 2013].

Guitar Rising [online] URL: http://www.guitarrising.com/about.html [retrieved on Dec. 14, 2010].

Harmony Central, Vox ships jamvox, software/hardware modeling interface with gxt guitar xtracktion™ technology. Press Release Nov. 4, 2008, [online] URL: http://news.harmony-central/com/Newp/2008/Vox-JamVOX-Software-Hardware-Modeling-Interface.html [retrieved on Feb. 13, 2009].

IPerform$^{3D}$, Rotate. Zoom. Rock. [online] URL: http://www.iperform3d.com/howitworks.aspx [retrieved on Dec. 14, 2010].

Jam Play. Learn how to play guitar with online, video guitar lessons! [online] URL: http://www.jamplay.com/ [retrieved on Dec. 14, 2010].

Jam Vox, Jam and practice tool for guitar. [online] URL: http://www.voxamps.com/jamvox/ [retrieved on Dec. 14, 2010].

(56) References Cited

OTHER PUBLICATIONS

Kan, M.Y., et al. LyricAlly: Automatic Synchronization of Textual Lyrics to Acoustic Music Signals. IEEE Transactions on Audio, speech, and Language Processing. 16(2): 338-349 (2008).
line6.com, GuitarPort XT. [online] URL: http://line6.com/guitarport/ [retrieved on Dec. 14, 2010].
Mix Me In, iPhone App. [online] URL: http://www.mixmein.com/tour/ [retrieved on Dec. 14, 2010].
mpogd.com, Music rivals. [online] URL: http://www.mpogd.com/games/game.asp?ID=3038 [retrieved on Dec. 14, 2010].
Music Lab, Music software developers, real guitar. [online] URL: http://www.musiclab.com/products/realgtr_info.htm [retrieved on Dec. 14, 2010].
Music Minus One. [online] URL: http://www.musicminusone.com/ [retrieved on Dec. 14, 2010].
mxtabs.net. Free legal tablatur. [online]URL: http://www.mxtabs.net/about/ [retrieved on Dec. 14, 2010].
rockband.com. [online] URL: http://www.rockband.com/ [retrieved on Dec. 14, 2010].
StarPlayIt. [online] URL: http://starplayit.com/10/ [retrieved on Dec. 14, 2010].
Sheet Music Plus, World's largest sheet music selection. [online] URL: http://www.sheetmusicplus.com/ [retrieved on Dec. 14, 2010].
techcrunch.com, Bojam launches web-based collaborative. Sep. 30, 2009, [online] URL: http://techcrunch.com/2009/09/30/bojam-launches-web-based-collaborative-sound-studio/ [retrieved on Dec. 14, 2010].
techcrunch.com, Songsterr: A flash guitar tab player that might rock, someday. [online] URL: http://techcrunch.com/2008/08/19/songsterr-a-flash-guitar-tab-player-that-might-rock-someday/ [retrieved on Dec. 14, 2010].
Wired, Interactive music format pregnant with possibility. Sep. 9, 2008, [online] URL: http://www.wired.com/listening_post/2008/09/dudemark-musina/ [retrieved on Dec. 14, 2010].
Wired, Gadget Lab Video: The holy grail of music gaming. [online] URL: http: //www.wired.com/gadgetlab/2009/01/finally-a-guita/ [retrieved on Dec. 14, 2010].
Wonderland Blog, Dance MMO. [online] URL: http://www.wonderlandblog.com/wonderland/2006/01/dance_mmo.html [retrieved on Dec. 14, 2010].

* cited by examiner

SYNCHRONIZED AUDIOVISUAL WORK

CROSS-REFERENCE TO RELATED APPLICATIONS

This application is a continuation of U.S. application Ser. No. 16/862,131, filed Apr. 29, 2020, which is continuation of U.S. application Ser. No. 16/229,973, filed Dec. 21, 2018, now U.S. Pat. No. 10,679,515, issued Jun. 9, 2020, which is a continuation of U.S. application Ser. No. 15/446,428, filed Mar. 1, 2017, now U.S. Pat. No. 10,192,460, issued Jan. 29, 2019, which is a continuation of U.S. application Ser. No. 15/062,165, filed Mar. 6, 2016, now U.S. Pat. No. 9,626,877, issued Apr. 18, 2017, which is a continuation of U.S. application Ser. No. 13/886,269, filed May 2, 2013, now U.S. Pat. No. 9,311,824, issued Apr. 12, 2016, which is a continuation of U.S. application Ser. No. 13/115,937, filed May 25, 2011, now U.S. Pat. No. 8,476,517, issued Jul. 2, 2013, which is a continuation of Ser. No. 13/023,485, filed Feb. 8, 2011, now U.S. Pat. No. 8,207,438, issued Jun. 26, 2012, which is a continuation of U.S. application Ser. No. 12/390,393, filed Feb. 20, 2009, now U.S. Pat. No. 7,902,446, issued Mar. 8, 2011, and claims the benefit of U.S. Provisional Application No. 61/030,174, filed Feb. 20, 2008, each application of which is hereby incorporated herein by reference in its entirety.

BACKGROUND

Field of the Invention

The teachings generally relate to a system for learning and mixing music, the system having a processor, a custom digital audio file database, a transformation module, an emulation recording module, an integration engine, an input device to record music, and output devices that include a graphical user interface and a speaker to deliver music to a user.

Description of the Related Art

Multi-track recording technology provides flexibility to record music as individual audio tracks, either together or independently, and then mix the audio tracks to produce a desired compilation of music for distribution. The distributed versions will normally have a reduced number of tracks: a single track in the case of mono-sound, two tracks for stereo sound and typically six tracks for a surround sound system. When the music is compiled to have a reduced number of tracks, the musical parts are combined in such a way that accessing individual instrument contributions becomes difficult-to-impossible.

Musicians and singers have a longfelt-but-unsolved need to clearly isolate a musical instrument track from a preselected piece of music, whether that musical instrument comprises the vocal cords of a human being, a brass instrument in big band, a string instrument, a percussion instrument, or any other musical instrument known to one of skill. And, currently, there is no way to hear all of the articulations and details in a performance that a user desires to learn, particularly when the performance is in an embedded mix of music. This is particularly a problem for users that cannot read music. Unfortunately, current methods of separating sounds through equalization or the use of algorithms to mask other sounds or pull out particular frequencies have been insufficient to address the need. The isolation of a musical instrument track from the preselected music would allow one to emulate the preselected piece of music on a preselected musical instrument in a process of learning the music. Musicians currently attempt to play along with a recording of a musical compilation. The problem, however, is that the musician finds it difficult to clearly identify all aspects of the preselected piece of music as it is embedded in a musical compilation.

Musicians can also obtain a modified musical compilation having a musical instrument removed from it, and the musician can play along with the modified musical compilation. The problem, however, is that the musician cannot listen to the musical instrument alone with the details that are contributed by the musical instrument to the musical compilation. Moreover, the musician does not have the ability to record and mix the musician's performance with the prerecorded portions of the work, so that the musician can self-critique the performance to enhance learning.

Accordingly, one of skill will appreciate a system that allows a user to (1) obtain a custom digital audio file of a preselected piece of music, (2) transform the custom digital audio file into an isolated instrument audio track or an emulation audio track, (3) emulate the preselected piece of music with a preselected musical instrument, (4) record an emulated instrument audio track, combine the emulated instrument audio track with the emulation audio track to transform the custom digital audio file into an education audio track, (5) listen to the educational audio track to identify deficiencies in the accuracy of the emulating, and (6) repeat the emulating, recording, combining, and listening until the preselected piece of music has been learned on the preselected musical instrument. Moreover, a system that is interactive and fun to use will make the learning experience more rewarding to the user and the system more attractive to the marketplace. Such a system will address a longfelt and unsolved need of musicians and vocalists, whether accomplished or aspiring.

SUMMARY

The teachings described herein are generally directed to a system for learning music through an educational audio track embodied on a computer readable medium. The system can comprise components including a processor, an input device, a database, a transformation module, an emulation recording module, an integration engine, an output module, and an output device, wherein each component is operable in itself to perform its function in the system and operable with other system components to provide a system to a user for learning music.

In some embodiments, the teachings are directed to a method of learning music through an educational audio track. The method includes obtaining a multi-track digital audio file produced from a multi-track digital audio recording. The multi-track digital audio file comprises an isolated instrument audio track and an emulation audio track, and the isolated instrument audio track comprises a single musical instrument playing a preselected piece of music that a user desires to learn on a preselected musical instrument. The method includes transforming the composition of a multi-track digital audio file to include a ratio of (i) the isolated instrument audio track to (ii) an emulation audio track. The emulation audio track represents a subtraction of the isolated instrument audio track from the plurality of audio tracks, and the gain ratio is selected by the user. The method includes emulating the preselected piece of music by listening to the isolated instrument audio track and playing the preselected musical instrument to create an emulated instrument audio track. The emulated instrument audio track is recorded on a computer readable medium and combined with the emulation audio track to transform the custom digital audio file into an educational audio file. The method includes listening to the educational audio track to identify deficiencies in the emulating by the user. The user repeats the emulating, recording, combining, and listening until the user has learned the preselected piece of music on the preselected musical instrument to the user's satisfaction.

In some embodiments, the transforming includes reducing the volume of the emulation audio track and, in some embodiments, the transforming includes reducing the volume of the isolated instrument audio track.

The method can further comprise selecting one or more bars of the isolated instrument audio track to enable the user to focus on emulating a section of the preselected piece of music. In some embodiments, the method can include looping the selection one or more bars to provide a repeated playback of the section.

In some embodiments, the emulating can further comprise reading a digital musical transcription and tablature display corresponding to the isolated instrument audio track. And, in some embodiments, the custom digital audio file further comprises an isolated metronome audio track, and the method further comprises listening to the isolated metronome audio track that is designed for the preselected piece of music.

The teachings include a system comprising a processor, an input device operable to receive audio data on a computer readable medium, a database operable to store audio files on a computer readable medium for access, and a transformation module embodied in a computer readable medium. In some embodiments, the transformation module is operable to transform a multi-track digital audio file comprising an isolated instrument audio track and an emulation audio track into a ratio of (i) the isolated instrument audio track to (ii) the emulation audio track. The emulation audio track represents a subtraction of the isolated instrument audio track from the plurality of audio tracks, and the transforming can result from a user selecting a gain ratio between the isolated instrument audio track, the emulation audio track, and the metronome track. The system can also include an emulation recording module embodied in a computer readable medium. The emulation recording module is operable to record the user's emulated audio track on a computer readable medium. The system can also include an integration engine embodied in a computer readable medium, wherein the integration engine is operable to combine the emulated instrument audio track with the emulation audio track to transform the multi-track digital audio file into an educational audio file. In addition, the system can include an output module embodied in a computer readable medium, wherein the output module is operable to transmit audio data to an output device. The output device can be operable to provide audio data to the user, wherein the audio data assists the user in learning a preselected piece of music.

In some embodiments, the input device comprises a microphone or a line input. The line input can be used, for example, for the user to input audio data from their musical instrument into the system for learning and mixing music. For example, the microphone could receive audio from a piano, or the line input could receive output from a guitar amplifier. One of skill will appreciate that the data input can be analog or digital, and that conversions can be where necessary.

In some embodiments, the output module transmits music transcription and tablature data to a graphical user interface.

The output module can also have a recalibration function operable to recalibrate an audio data track output to correct a latency in the output of the audio track data. In some embodiments, the output device comprises a speaker, a graphical user interface, or both a speaker and a graphical user interface, for example. And, in some embodiments, the output module has a synchronization function operable to synchronize the music transcription and tablature data display on the graphical user interface with the isolated instrument audio track provided to the listener through the speaker.

The multi-track digital audio file can further comprise a metronome audio track. As such, in some embodiments, the transformation module can be operable to transform the multi-track digital audio file into a ratio of (i) the isolated instrument audio track. (ii) the emulation audio track, and (iii) the metronome audio track, and a gain ratio between the isolated instrument audio track, the emulation audio track, and the metronome audio track can be selected by the user.

The system can further comprise a data exchange module embodied in a computer readable medium, wherein the data exchange module is operable to exchange data with external computer readable media. In some embodiments, the system is contained in a hand-held device; operable to function as a particular machine or apparatus having the additional function of telecommunications, word processing, or gaming; or operable to function as a particular machine or apparatus not having other substantial functions.

The teachings are also directed to a handheld apparatus for learning music. The apparatus can include a processor; an input device comprising a microphone and a data input port, wherein the input device is operable to receive and store audio data on a computer readable medium; a database operable to store audio files on a computer readable medium for access; and a transformation module embodied in a computer readable medium. The transformation module can be operable to transform a multi-track digital audio file comprising an isolated instrument audio track, an emulation audio track, and a metronome track into a ratio of (i) the isolated instrument audio track, (ii) the emulation audio track, and (iii) the metronome track. The emulation audio track represents a subtraction of the isolated instrument audio track from the plurality of audio tracks, and the transforming can result from a user selecting a gain ratio between the isolated instrument audio track, the emulation audio track, and the metronome track. The apparatus includes an emulation recording module embodied in a computer readable medium, wherein the emulation recording module is operable to record the user's emulated audio track on a computer readable medium. The apparatus includes an integration engine embodied in a computer readable medium, wherein the integration engine is operable to combine the emulated instrument audio track with the emulation audio track to transform the multi-track digital audio file into an educational audio file. The apparatus includes an output module embodied in a computer readable medium, wherein the output module is operable to transmit audio data to an output device. And, the apparatus includes an output device comprising a speaker and a graphical user interface. The output device can be operable to provide audio data to the user in the form of sound and graphics, wherein the audio data assists the user in learning a preselected piece of music.

In some embodiments, the apparatus is operable to function as a particular machine or apparatus having the additional function of telecommunications, word processing, or gaming; or operable to function as a particular machine or apparatus not having other substantial functions.

The teachings are also directed to a metronome for measuring time in music, wherein the metronome comprises a processor, an input device operable to receive audio data on a computer readable medium, and a database operable to store audio files on a computer readable medium for access, wherein the audio files comprise metronome audio tracks that were designed for a preselected piece of music. The metronome includes a transformation module embodied in a computer readable medium, wherein the transformation module can be operable to transform a multi-track digital audio file comprising a preselected music track and a metronome track into a ratio of (i) the preselected music track to (ii) the metronome track. The transforming can result from a user selecting a gain ratio between the preselected music track and the metronome track. The metronome includes an output module embodied in a computer readable medium, wherein the output module is operable to transmit audio data to an output device. The output device can be operable to provide audio data to the user, wherein the audio data assists the user in learning a preselected piece of music.

There are a variety of ways that a metronome audio track can be designed for the preselected piece of music. In some embodiments, the metronome audio track can be designed using the preselected piece of music in a digital audio workstation (DAW), such as PROTOOLS (a Digidesign product) or LOGIC (an Apple product). Using the digital audio workstation, a programmer locates transients in the multi-track digital audio file such as, for example, the location of each quarter note, where the quarter note is the transient. The programmer places a MIDI note on a MIDI track to represent each transient. In some embodiments, the MIDI note is placed wherever the transient lies, such as an eighth note, quarter note, or the like. The space between each MIDI note that was manually created is calculated to determine the beats per minute of each bar of music for the preselected piece if music. A tempo map is created by analyzing the MIDI track with the manually created MIDI notes. A metronome audio file is created by placing an audio sound, such as a bell, wood block, cow bell, or any such tone on each beat of the tempo map that corresponds with the preselected piece of music. A music XML file is derived from the exported MIDI metronome track which is used to synchronize the graphical notation with the metronome audio track and the preselected piece of music.

In some embodiments, the metronome is operable to function as a particular machine or apparatus having the additional function of telecommunications, word processing, or gaming; or operable to function as a particular machine or apparatus not having other substantial functions.

DETAILED DESCRIPTION OF THE INVENTION

The teachings described herein are generally directed to a system for learning music through an educational audio track embodied on a computer readable medium. The system can comprise components including a processor, an input device, a database, a transformation module, an emulation recording module, an integration engine, an output module, and an output device, wherein each component is operable in itself to perform its function in the system and operable with other system components to provide a system to a user for learning music.

The teachings include a system comprising a processor, an input device operable to receive audio data on a computer readable medium, a database operable to store audio files on a computer readable medium for access, and a transformation module embodied in a computer readable medium. In some embodiments, the transformation module is operable to transform a multi-track digital audio file comprising an isolated instrument audio track and an emulation audio track into a ratio of (i) the isolated instrument audio track to (ii) the emulation audio track. The emulation audio track represents a subtraction of the isolated instrument audio track from the plurality of audio tracks, and the transforming can result from a user selecting a gain ratio between the isolated instrument audio track, the emulation audio track, and the metronome track. The system can also include an emulation recording module embodied in a computer readable medium. The emulation recording module is operable to record the user's emulated audio track on a computer readable medium. The system can also include an integration engine embodied in a computer readable medium, wherein the integration engine is operable to combine the emulated instrument audio track with the emulation audio track to transform the multi-track digital audio file into an educational audio file. In addition, the system can include an output module embodied in a computer readable medium, wherein the output module is operable to transmit audio data to an output device. The output device can be operable to provide audio data to the user, wherein the audio data assists the user in learning a preselected piece of music.

Figure 1:
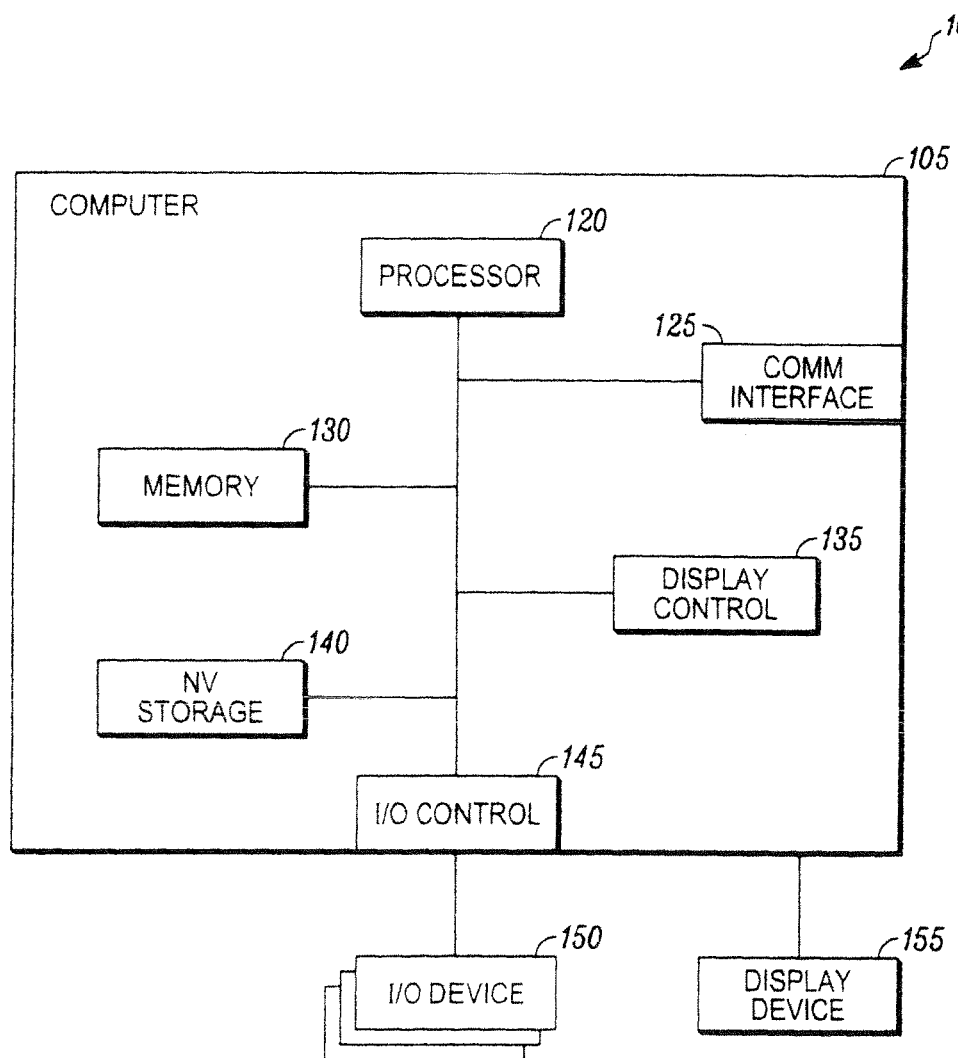
FIG. 1 shows a general technology platform for the system for learning and mixing music, according to some embodiments.

FIG. 1 shows a general technology platform for the system for learning and mixing music, according to some embodiments. The computer system 100 may be a conventional computer system and includes a computer 105, I/O devices 150, and a display device 155. The computer 105 can include a processor 120, a communications interface 125, memory 130, display controller 135, non-volatile storage 140, and I/O controller 145. The computer system 100 may be coupled to or include the I/O devices 150 and display device 155.

The computer 105 interfaces to external systems through the communications interface 125, which may include a modem or network interface. It will be appreciated that the communications interface 125 can be considered to be part of the computer system 100 or a part of the computer 105. The communications interface 125 can be an analog modem, isdn modem, cable modem, token ring interface, satellite transmission interface (e.g. "direct PC"), or other interfaces for coupling the computer system 100 to other computer systems. In a cellular telephone, this interface is typically a radio interface for communication with a cellular network and may also include some form of cabled interface for use with an immediately available personal computer. In a two-way pager, the communications interface 125 is typically a radio interface for communication with a data transmission network but may similarly include a cabled or cradled interface as well. In a personal digital assistant, the communications interface 125 typically includes a cradled or cabled interface and may also include some form of radio interface, such as a BLUETOOTH or 802.11 interface, or a cellular radio interface, for example.

The processor 120 may be, for example, a conventional microprocessor such as an Intel Pentium microprocessor or Motorola power PC microprocessor, a Texas Instruments digital signal processor, or a combination of such components. The memory 130 is coupled to the processor 120 by a bus. The memory 130 can be dynamic random access memory (DRAM) and can also include static ram (SRAM). The bus couples the processor 120 to the memory 130, also to the non-volatile storage 140, to the display controller 135, and to the I/O controller 145.

The I/O devices 150 can include a keyboard, disk drives, printers, a scanner, and other input and output devices, including a mouse or other pointing device. The display controller 135 may control in the conventional manner a display on the display device 155, which can be, for example, a cathode ray tube (CRT) or liquid crystal display (LCD). The display controller 135 and the I/O controller 145 can be implemented with conventional well known technology, meaning that they may be integrated together, for example.

The non-volatile storage 140 is often a FLASH memory or read-only memory, or some combination of the two. A magnetic hard disk, an optical disk, or another form of storage for large amounts of data may also be used in some embodiments, although the form factors for such devices typically preclude installation as a permanent component in some devices. Rather, a mass storage device on another computer is typically used in conjunction with the more limited storage of some devices. Some of this data is often written, by a direct memory access process, into memory 130 during execution of software in the computer 105. One of skill in the art will immediately recognize that the terms "machine-readable medium" or "computer-readable medium" includes any type of storage device that is accessible by the processor 120 and also encompasses a carrier wave that encodes a data signal. Objects, methods, inline caches, cache states and other object-oriented components may be stored in the non-volatile storage 140, or written into memory 130 during execution of, for example, an object-oriented software program.

The computer system 100 is one example of many possible different architectures. For example, personal computers based on an Intel microprocessor often have multiple buses, one of which can be an I/O bus for the peripherals and one that directly connects the processor 120 and the memory 130 (often referred to as a memory bus). The buses are connected together through bridge components that perform any necessary translation due to differing bus protocols.

In addition, the computer system 100 can be controlled by operating system software which includes a file management system, such as a disk operating system, which is part of the operating system software. One example of an operating system software with its associated file management system software is the family of operating systems known as Windows CE® and Windows® from Microsoft Corporation of Redmond, Washington, and their associated file management systems. Another example of operating system software with its associated file management system software is the LINUX operating system and its associated file management system. Another example of an operating system software with its associated file management system software is the PALM operating system and its associated file management system. The file management system is typically stored in the non-volatile storage 140 and causes the processor 120 to execute the various acts required by the operating system to input and output data and to store data in memory, including storing files on the non-volatile storage 140. Other operating systems may be provided by makers of devices, and those operating systems typically will have device-specific features which are not part of similar operating systems on similar devices. Similarly, WinCE® or PALM operating systems may be adapted to specific devices for specific device capabilities.

The computer system 100 may be integrated onto a single chip or set of chips in some embodiments, and can be fitted into a small form factor for use as a personal device. Thus, it is not uncommon for a processor, bus, onboard memory, and display/I-O controllers to all be integrated onto a single chip. Alternatively, functions may be split into several chips with point-to-point interconnection, causing the bus to be logically apparent but not physically obvious from inspection of either the actual device or related schematics.

Figure 2:
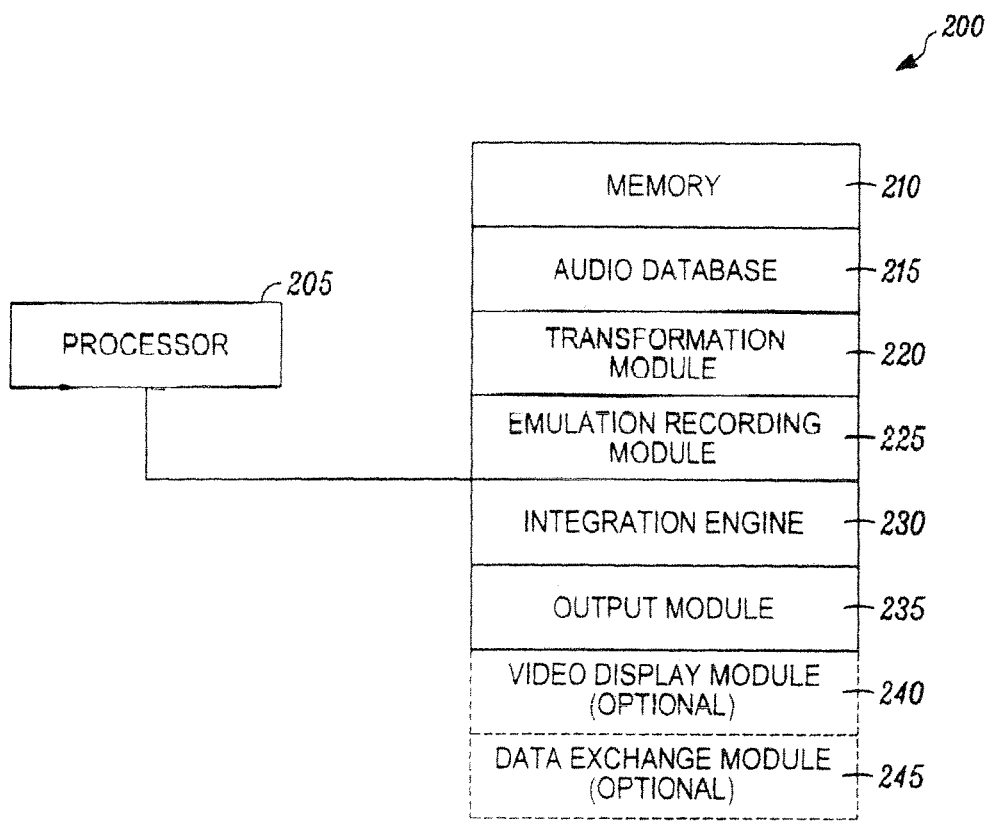
FIG. 2 illustrates a processor-memory diagram to describe components of the system for learning and mixing music, according to some embodiments.

FIG. 2 illustrates a processor-memory diagram to describe components of the system for learning and mixing music, according to some embodiments. The system 200 shown in FIG. 2 contains a processor 205 and a memory 210 (that can include non-volatile memory), wherein the memory 210 includes an audio database 215, a transformation module 220, an emulation recording module 225, an integration engine 230, an output module 235, and an optional video display module 240, which can also be a part of the output module 235. The system can further comprise an optional data exchange module 245 embodied in a computer readable medium, wherein the data exchange module is operable to exchange data with external computer readable media.

The system includes an input device (not shown) operable to receive audio data on a computer readable medium. Examples of input devices include a data exchange module operable to interact with external data formats, voice-recognition software, a hand-held device in communication with the system including, but not limited to, a microphone, and the like.

The audio database 215 is operable to store audio files for access on a computer readable medium. In some embodiments, the system can store original multi-track audio files, copies of original multi-track audio files, and the like. Any audio file known to one of skill in the art can be stored including, but not limited to sound files, text files, image files, and the like. In some embodiments, the system can access any of a variety of accessible data through a data exchange module, as discussed above.

Any audio format known to one of skill in the art can be used. In some embodiments, the audio file comprises a format that supports one audio codec and, in some embodiments, the audio file comprises a format that supports multiple codecs. In some embodiments the audio file comprises an uncompressed audio format such as, for example, WAV, AIFF, and AU. In some embodiments, the audio file format comprises lossless compression such as, FLAC, Monkey's Audio having file extension APE, WayPack having file extension WV, Shorten, Tom's lossless Audio Kompressor (TAK), TTA, ATRAC Advanced Lossless, Apple Lossless, and lossless WINDOWS Media Audio (WMA). In some embodiments, the audio file format comprises lossy compression, such as MP3, Vorbis, Musepack, ATRAC, lossy WINDOWS Media Audio (WMA) and AAC.

In some embodiments, the audio format is an uncompressed PCM audio format, as a ".wav" for a WINDOWS computer readable media, or as a ".aiff" as a MAC OS computer readable media. In some embodiments a Broadcast Wave Format (BWF) can be used, allowing metadata to be stored in the file. In some embodiments, the audio format is a lossless audio format, such as FLAC, WayPack, Monkey's Audio, ALAC/Apple Lossless. In some embodiments, the lossless audio format provides a compression ratio of about 2:1. In some embodiments, the audio format is a free-and-open format, such as wav, ogg, mpc, flac, aiff, raw, au, or mid, for example. In some embodiments, the audio format is an open file format, such as gsm, dct, vox, aac, mp4/m4a, or mmf. In some embodiments the audio format is a proprietary format, such as mp3, wma, atrac, ra, ram, dss, msv, dvg, IVS, m4p, iklax, mxp4, and the like.

The transformation module 220 is operable to transform a multi-track digital audio file comprising an isolated instrument audio track and an emulation audio track into a ratio of (i) the isolated instrument audio track to (ii) the emulation audio track, wherein the emulation audio track represents a subtraction of the isolated instrument audio track from the plurality of audio tracks, and the transforming can results from a user selecting a gain ratio, for example, between the isolated instrument audio track, the emulation audio track, and the metronome track.

The emulation audio track represents a subtraction of the isolated instrument audio track from the plurality of audio tracks, and the transforming can result from a user selecting a gain ratio between the isolated instrument audio track, the emulation audio track, and the metronome track. The system can also include an emulation recording module 225 embodied in a computer readable medium. The emulation recording module 225 is operable to record the user's emulated audio track on a computer readable medium. In some embodiments, the emulation recording module 225 can be operable within a single functioning section of a system, such as a single page of a software application. In some embodiments, the emulation recording module 225 can be operable within a plurality of functioning sections of a system, such as in a plurality of pages of a software application, such that the recording can occur quickly at the choosing of the user without having to move from one section of the system to another section of the system.

The system can also include an integration engine 230 embodied in a computer readable medium, wherein the integration engine 230 is operable to combine the emulated instrument audio track with the emulation audio track to transform the multi-track digital audio file into an educational audio file. In addition, the system can include an output module 235 embodied in a computer readable medium, wherein the output module 235 is operable to transmit audio data to an output device, which can be a graphical user interface, or video display, which can optionally be supported by a separate video display module 240, or the display can be supported with one or more other output devices by the output module 235. The output device can be operable to provide audio data to the user, wherein the audio data assists the user in learning a preselected piece of music.

In some embodiments, the input device comprises a microphone and, in some embodiments, the output module 235 transmits music transcription and tablature data to a graphical user interface. In some embodiments, the output device comprises a speaker, a graphical user interface, or both a speaker and a graphical user interface, for example. And, in some embodiments, the output module has a synchronization function operable to synchronize the music transcription and tablature data display on the graphical user interface with the isolated instrument audio track provided to the listener through the speaker.

The output module 235 can also have a recalibration function operable to recalibrate an audio data track output to correct a latency in the output of the audio track data. One of skill will appreciate that time stamps can be used to align, recalibrate, and correct latencies in the output of a data stream flow. In some embodiments, the latency is corrected by time stamping samples of the audio data, where a "sample" is a short wave form of the audio having a length measured by an increment of time. In some embodiments, a sample is less than a second long, (e.g., about $\frac{1}{100}$ or $\frac{1}{1000}$ of a seconds long). In some embodiments, the samples can be about $\frac{44}{1000}$ of a second long. An audio track can contain, for example, about 44000 samples per track per second in a high quality sound file. As such, the concept of a sample and sample resolution is a measure of audio resolution or quality. A lower quality mono audio file has about 22000 samples per track per second, for example.

Recalibration techniques can be used in some embodiments. Bandwidth limitations of a computer system, for example, can create variations or transients in misalignments between tracks and hinder sound quality. A computer having a smaller CPU than another computer having a larger CPU but similar memory capacity can have latency problems that result in performance problems In some embodiments, the system can provide an output of 4 streaming files, and these files can include (i) an emulation audio track that does not contain the isolated instrument audio track, (ii) an isolated instrument audio track, (iii) an emulated instrument audio track, and (iv) a metronome audio track. In some embodiments, the emulation audio track, the isolated instrument audio track, and the emulated instrument audio track are stereo files and, in some embodiments, the metronome audio track is a mono file. Each track in each file has it's own timeline, and there can be acceptable variances that are not noticeable to the ear, but there can also be unacceptable variances that result in an unacceptable and audible degradation in audio quality.

Each input file is comprised of an array of samples, and each sample can be used as a marker in time, since each sample position has an actual position that will serve as a measure of variance against an ideal position. The recalibration is performed on sets of samples. When a group of samples is off in time, the system can be designed to correct for the next set of samples. For example, a system can be designed to recalibrate based on a sample resolution that provides a 0.001 second accuracy by measuring the variance of a time stamp on a group of 44 samples (0.001 of a second for a 44000 sample/sec high quality sample) to an ideal time stamp for that sample set. A fast method of recalibration was developed to reduce this variance or "latency" in the audio so that it's not detectable to human being. A good ear, for example, can hear time variance between tracks of about $\frac{1}{60}$ of a second, and multiple events of variances in a closely related string of samples can be cumulative, making it necessary to have a variance at least an order of magnitude under $\frac{1}{60}$ of a second. In some embodiments, the minimum audio resolution in a sample for latency correction should be no less than 300 samples in a segment. In some embodiments, the audio resolution in a sample for latency correction is about 44 samples in a segment. In some embodiments, it was found that the recalibration should be done on each "run through" of the data in the system, where a "run through" is an emptying and a filling of a data queue in the system. Between data loads in a queue, the recalibration occurs by measuring the difference between the actual time of each track and the ideal time of each track and a correction is applied between data loads. In some embodiments, the audio queues up several hundred times per second.

The CPU on a handheld computer system can have difficulties concurrently processing the audio data files described herein. In some embodiments, a handheld computing system may have latency difficulties when concurrently processing more than 2 audio data files. As such, data files may require compression. In some embodiments, the data files can be compressed using a compression technique, for example, such as QUICKTIME by Apple. Other file compression techniques can be used. IMA4 can also be used to compress the files in some embodiments. In some embodiments, the system requires at least a 600-700 MHz processor. The iPhone has a 400 MHz processor, on the other hand, suggesting that compressed audio data files may be needed for use of some embodiments of the system on the iPhone. The IMA4 compression method compresses the audio data file to about 25% of file size.

In some embodiments, it should be appreciated, however, that the system can use pure, uncompressed wave files. Most home PCs, however, will not need compressed files due to the more powerful processors currently available for home PCs. The bandwidth of the computer system, i.e. the size of the CPU and memory will dictate whether compression is necessary. One of skill in the art will appreciate that certain compression technologies may be needed in some systems for optimum performance and that these technologies are readily identifiable and accessible.

One of skill will appreciate that time stamping of data samples can also be used to synchronize between other data streams. In some embodiments, an additional audio data stream is used to provide a digital musical transcription and tablature display in the form of a graphical display. This audio data can be synchronized and recalibrated at the same time as the other audio data.

The multi-track digital audio file can further comprise a metronome audio track. As such, in some embodiments, the transformation module 220 can be operable to transform the multi-track digital audio file into a ratio of (i) the isolated instrument audio track, (ii) the emulation audio track, and (iii) the metronome audio track, and a gain ratio between the isolated instrument audio track, the emulation audio track, and the metronome audio track can be selected by the user.

As described above, the system can further comprise an optional data exchange module 245 embodied in a computer readable medium, wherein the data exchange module is operable to exchange data with external computer readable media. The data exchange module can, for example, serve as a messaging module operable to allow users to communicate with other users having like subject-profiles, or others users in a profile independent manner, merely upon election of the user. The users can email one another, post blogs, or have instant messaging capability for real-time communications. In some embodiments, the users have video and audio capability in the communications, wherein the system implements data streaming methods known to those of skill in the art. In some embodiments, the system is contained in a hand-held device; operable to function as a particular machine or apparatus having the additional function of telecommunications, word processing, or gaming; or operable to function as a particular machine or apparatus not having other substantial functions.

The systems taught herein can be practiced with a variety of system configurations, including personal computers, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network. As such, in some embodiments, the system further comprises an external computer connection through the data exchange module 245 and a browser program module (not shown). The browser program module (not shown) can be operable to access external data as a part of the data exchange module 245.

Figure 3:
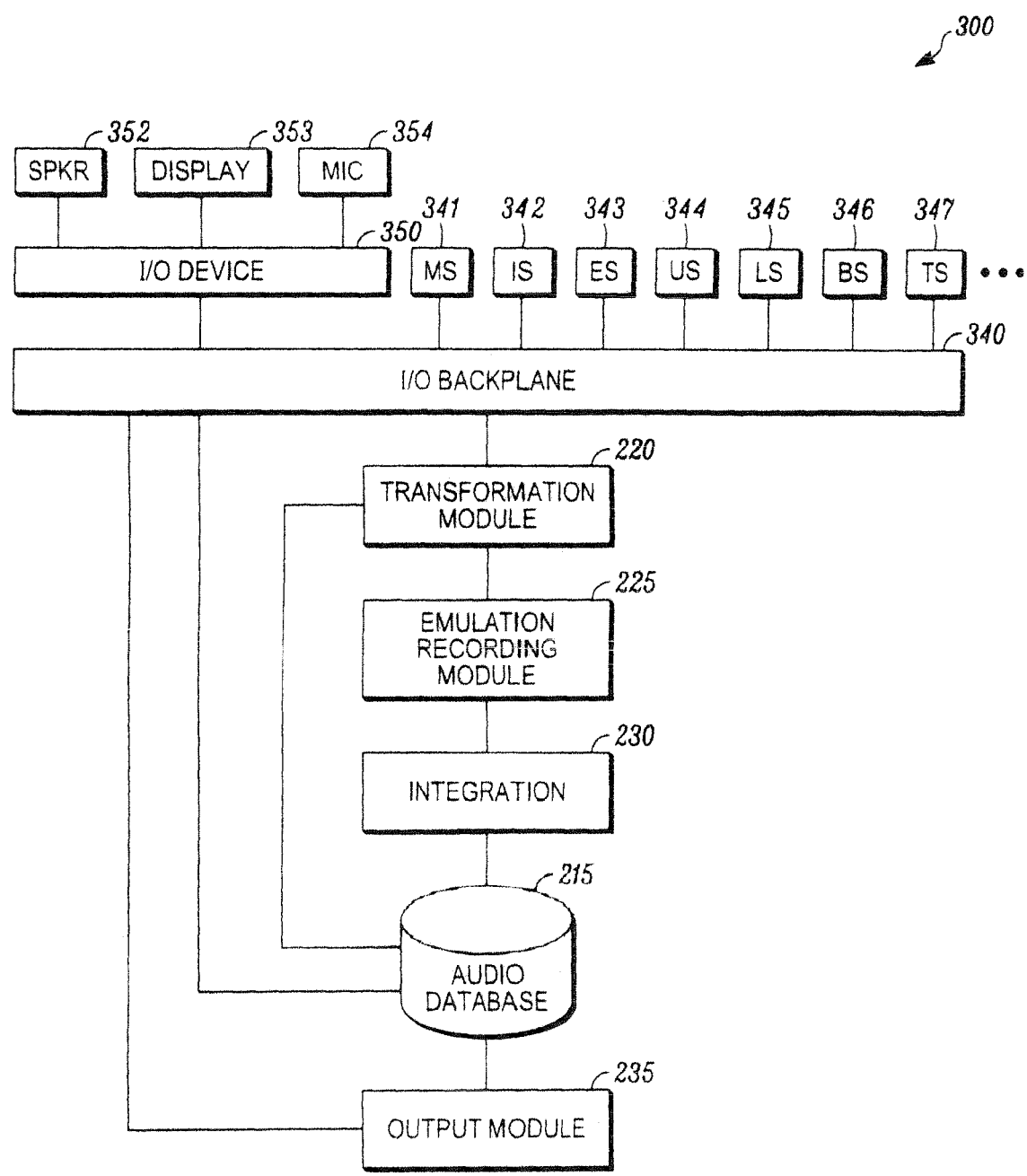
FIG. 3 is a concept diagram illustrating the system for learning and mixing music, according to some embodiments.

FIG. 3 is a concept diagram illustrating the system for learning and mixing music, according to some embodiments. The system 300 contains components that can be used in a typical embodiment. In addition to the audio database 215, the transformation module 220, the emulation recording module 225, the integration engine 230, and the output module 235 shown in FIG. 2, the memory 210 of the device 300 also includes a data exchange module 245 and the browser program module (not shown) for accessing the external data. The system includes a speaker 352, display 353, and a printer 354 connected directly or through I/O device 350, which is connected to I/O backplane 340.

The system 300 can be implemented in a stand-alone device, rather than a computer system or network. In FIG. 3, for example, the I/O device 350 connects to the speaker (spkr) 352, display 353, and microphone (mic) 354, but could also be coupled to other features. Such a device can have a music state selector 341, an isolated instrument audio track state selector 342, an emulation audio track state selector 343, a user's emulated audio track state selector 344, a learning state selector 345 for the educational audio track, a bar state selector 346, and a timer state selector 347 for the metronome audio track, with each state selector connected directly to the I/O backplane 340.

In some embodiments, the system further comprises security measures to protect the subject's privacy, integrity of data, or both. Such security measures are those well-known in the art such as firewalls, software, and the like. In addition, the system can be configured for use in an environment that requires administrative procedures and control. For example, the system can include an administrative module (not shown) operable to control access, configure the engines, monitor results, perform quality assurance tests, and define audiences for targeting and trending. Since the system can safely be provided by a network and, in some embodiments, the system is coupled to a network, the security measures can help protect the contents of the system from external intrusions.

In some embodiments, the system is a web enabled application and can use, for example, Hypertext Transfer Protocol (HTTP) and Hypertext Transfer Protocol over Secure Socket Layer (HTTPS). These protocols provide a rich experience for the end user by utilizing web 2.0 technologies, such as AJAX, Macromedia Flash, etc. In some embodiments, the system is compatible with Internet Browsers, such as Internet Explorer, Mozilla Firefox, Opera, Safari, etc. In some embodiments, the system is compatible with mobile devices having full HTTP/HTTPS support, such as iPhone, PocketPCs, Microsoft Surface, Video Gaming Consoles, and the like. In some embodiments, the system can be accessed using a Wireless Application Protocol (WAP). This protocol will serve the non HTTP enabled mobile devices, such as Cell Phones, BlackBerries, etc., and provides a simple interface. Due to protocol limitations, the Flash animations are disabled and replaced with Text/Graphic menus. In some embodiments, the system can be accessed using a Simple Object Access Protocol (SOAP) and Extensible Markup Language (XML). By exposing the data via SOAP and XML, the system provides flexibility for third party and customized applications to query and interact with the system's core databases. For example, custom applications could be developed to run natively on iPhones, Java or .Net-enabled platforms, etc. One of skill will appreciate that the system is not limited to any of the platforms discussed above and will be amenable to new platforms as they develop.

Figure 4:
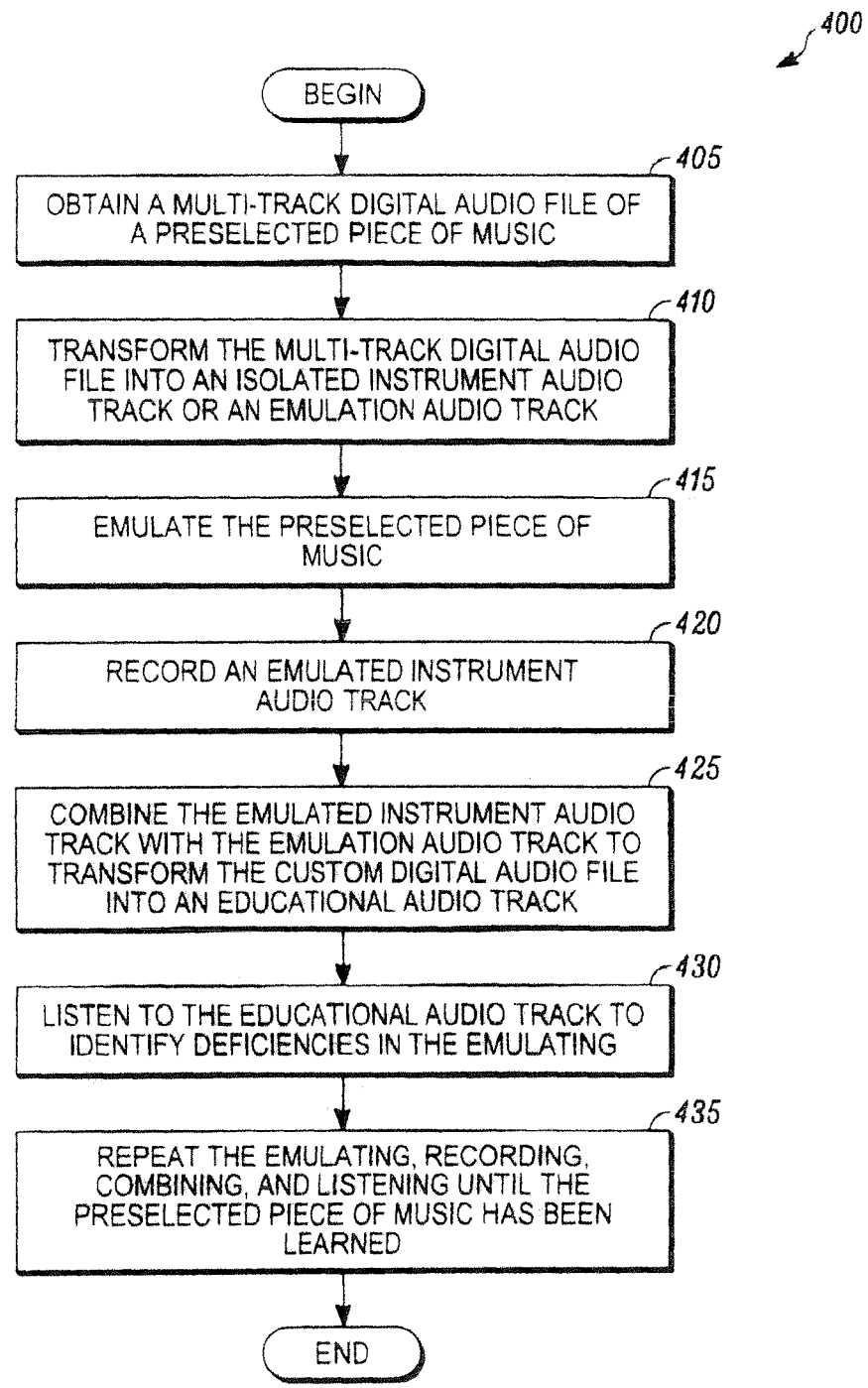
FIG. 4 is a diagram of the logic of the system for learning and mixing music, according to some embodiments.

FIG. 4 is a diagram of the logic of the system for learning and mixing music, according to some embodiments. In some embodiments, the teachings are directed to a method of learning music through an educational audio track. The method includes obtaining 405 a multi-track digital audio file produced from a multi-track digital audio recording. The multi-track digital audio file comprises an isolated instrument audio track and an emulation audio track, and the isolated instrument audio track comprises a single musical instrument playing a preselected piece of music that a user desires to learn on a preselected musical instrument. The method includes transforming 410 the composition of a multi-track digital audio file to include a ratio of (i) the isolated instrument audio track to (ii) an emulation audio track. The emulation audio track represents a subtraction of the isolated instrument audio track from the plurality of audio tracks, and the gain ratio is selected by the user. The method includes emulating 415 the preselected piece of music by listening to the isolated instrument audio track and playing the preselected musical instrument to create an emulated instrument audio track. The emulated instrument audio track is recorded 420 on a computer readable medium and combined 425 with the emulation audio track to transform the custom digital audio file into an educational audio file. The method includes listening 430 to the educational audio track to identify deficiencies in the emulating by the user. The user repeats 435 the emulating, recording, combining, and listening until the user has learned the preselected piece of music on the preselected musical instrument to the user's satisfaction.

In some embodiments, the transforming 410 includes reducing the volume of the emulation audio track and, in some embodiments, the transforming 410 includes reducing the volume of the isolated instrument audio track.

The method can further comprise selecting one or more bars of the isolated instrument audio track to enable the user to focus on emulating a section of the preselected piece of music. In some embodiments, the method can include looping the selection one or more bars to provide a repeated playback of the section.

In some embodiments, the emulating 415 can further comprise reading a digital musical transcription and tablature display corresponding to the isolated instrument audio track. And, in some embodiments, the custom digital audio file further comprises an isolated metronome audio track, and the method further comprises listening to the isolated metronome audio track that is designed for the preselected piece of music.

Figure 5:
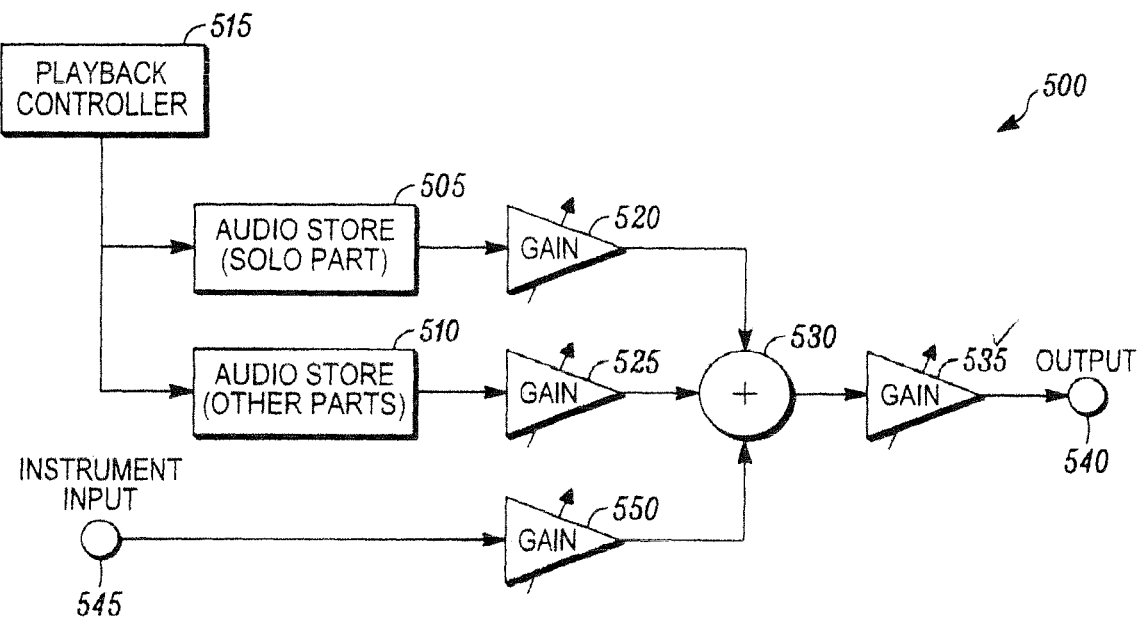
FIG. 5 illustrates a circuit diagram of the system for learning and mixing music, according to some embodiments.

FIG. 5 illustrates a circuit diagram of the system for learning and mixing music, according to some embodiments. The solo audio part (the part to be learned) is retained in an audio store 505, and the audio recording of the other parts of the composition are retained in an audio store 510. Storage areas 505 and 510 may reside in separate devices or in a single storage device, but can be accessed separately. The progressive retrieval of audio information from stores 505 and 510 is controlled by a playback controller 515 such that the various parts of the composition become synchronized in time. The solo audio signal can pass through a variable gain element 520 so that it's volume level in an overall output 540 can be controlled. Similarly, the other audio signals pass through a gain element 525 and are fed to a mixing element 530, to be combined with the solo instrument audio signal provided from gain element 520.

An external instrument input element 545 enables an external audio source, such as the practice instrument, to be included in overall output 540. The signal provided by instrument input element 545 passes through a gain element 550 before delivery to mixing element 530.

The overall output level can be controlled using a gain element 535, which receives an input signal from mixing element 530 and feeds an output signal to overall output 540. The various gain elements can be controlled directly through user controls or through signals from a controlling device such as a microprocessor. In some embodiments, other parts of the musical performance may be stored in separated storage areas to facilitate the learning process or to accommodate multiple players.

Figure 6:
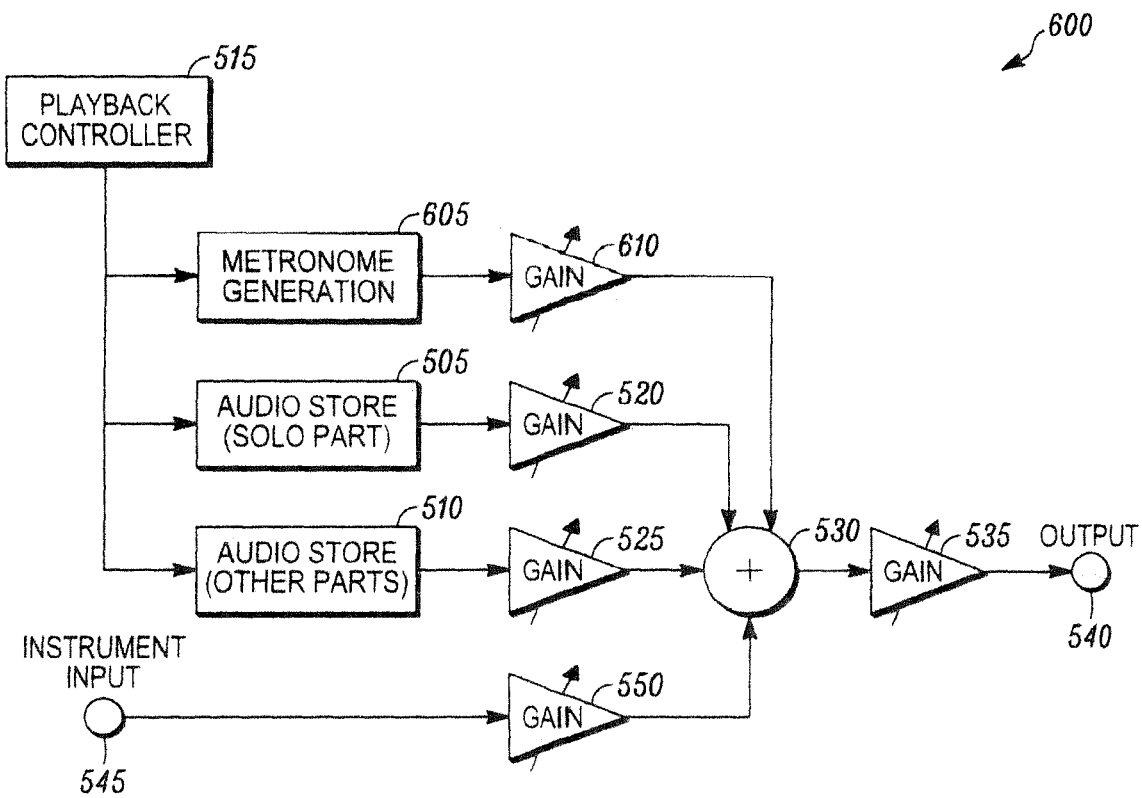
FIG. 6 illustrates a circuit diagram of the system for learning and mixing music including a metronome function, according to some embodiments.

FIG. 6 illustrates a circuit diagram of the system for learning and mixing music including a metronome function, according to some embodiments. An audible timing reference is included into the signal provided to the output of the device. This timing reference may be a periodic sound such as the click of a metronome, which can be recorded and stored in a method similar to that used for the other audio signals, or which may be synthesized by an audio signal generator 605 while the musical piece is being played. This additional sound is delivered to mixing element 530 via a variable gain element 610, which allows the audible level of the timing reference to be adjusted.

Figure 7:
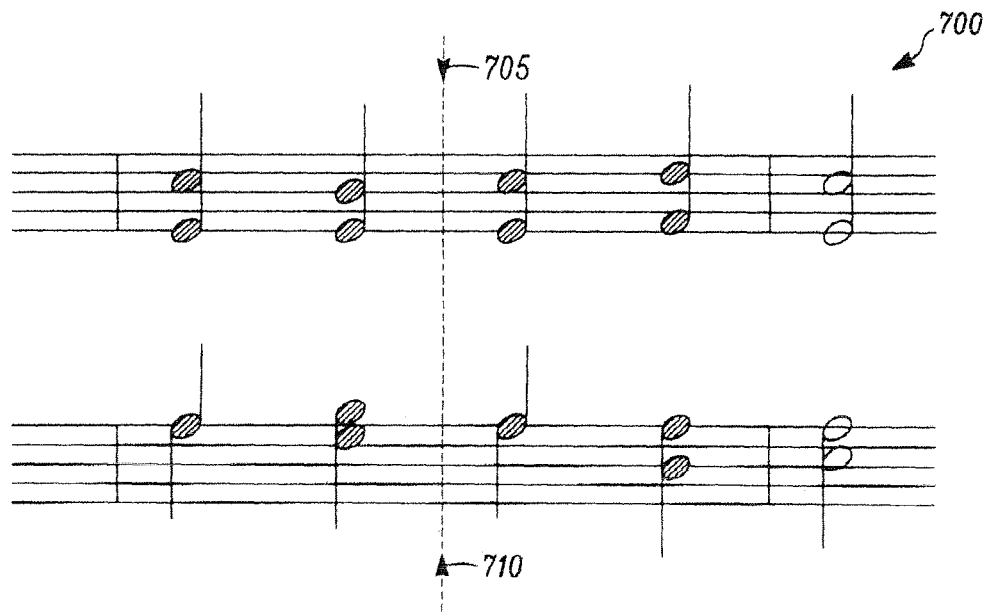
FIG. 7 illustrates a musical notation display designed for use with the system for learning and mixing music, according to some embodiments.

FIG. 7 illustrates a musical notation display designed for use with the system for learning and mixing music, according to some embodiments. In some embodiments, a display provides an animated graphical representation of the musical notation relative to the part to be learned, whereby such graphical representation scrolls along the display area in synchronism with the audio music signal. In particular, a time region 705,710 of the display area are marked to identify the present moment, with the graphical representation of the music moving past time region 705,710 as the music part is being played. By this arrangement, the display area enables a player to see musical events in advance that are immediately following the present moment. In some embodiments, a recent musical notation may also be seen in retrospect. Accordingly, the apparatus and methods of presenting musical notation are advantageous for at least the reason that a user is provided with a temporal context for the musical events of interest. Moreover, and contrary to traditional sheet music notation, the scrolling of the music can be continuous, removing the need for page turns.

Figure 8:
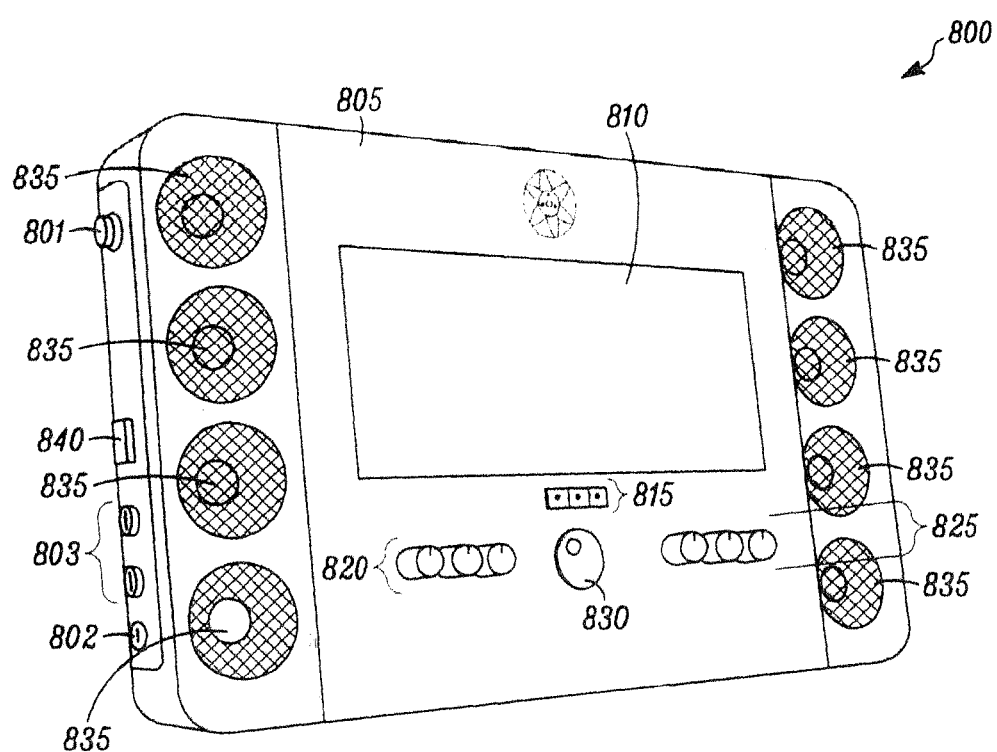
FIG. 8 illustrates a device for learning and mixing music designed for use with the system for learning and mixing music, according to some embodiments.

FIG. 8 illustrates a device for learning and mixing music designed for use with the system for learning and mixing music, according to some embodiments. The device can be configured for use with any musical instrument, for example, guitar, piano, drums, or a vocals. As shown in FIG. 8, a device 800 can be configured for use with a piano. The device 800 includes a housing or container 805, which can be of any shape, such as a shape designed to sit on top of a piano in place of standard sheet music. A music display 810, which may be a liquid crystal display (LCD) screen or other type of display screen, and one or more transport buttons 815 such as, for example, a play button, a stop button, and a pause button, can be provided.

The device 800 can comprise a number of controls, which may be configured as knobs or other similar state selectors known in the art. In FIG. 8, a first group of state selectors 820 relate to the "blender" function of the device 800 and are structured to control the user's input, the music without the piano contribution, and the piano itself. A second group of state selectors 825 relate to the "master" function of the device 800 and control volume, click (or metronome signal), and tempo. A third group of state selectors 801,830 control the on/off function of the device 800 and may include indicator lights, light intensity control, and additional playback controls, for example. The device 800 includes one or more speakers 835, a sound module for electric pianos (not shown), and one or more ports 802,803,840 for connecting the device 800 to other units such as, for example, USB ports, phono jacks, and power jacks, or perhaps musical instruments, such as electric organs and guitars, for example. In some embodiments, a USB port 840 may be used to connect the device 800 to a computer system. In some embodiments, for example, USB port 840 allows for downloading of audio data to a larger computer memory storage location. In some embodiments, data may also be supplied to device 800 and and/or stored in removable data memory cards. Wireless studio grade headphones may also be provided to the player. Such devices can be produced and configured for ease of use with any of a variety of instruments.

In some embodiments, the multi-track digital audio files are produced from original multi-track digital recordings, and these recordings may originate on analog tape, such as analog multi-track tape (e.g. 1 track to 24 tracks), a digital tape format (e.g. pulse code modulation, PCM, digital tape format). In some embodiments, an analog tape format is first transformed into a digital recording and a multi-track digital audio file is produced from the digital recording. In some embodiments, the original mix is recreated by taking all of the different tracks and making the mix to simulate the original recording. The mixing can be a manual process and can be done with an analog console, new digital console, or the mix can be done on a computer using basically any mixing technique known to one of skill. In some embodiments, older analog tapes need to be restored, such as by a baking procedure, before attempting a recreation.

It should be appreciated that the teachings can apply to any piece of music containing virtually any musical instrument including, but not limited to string instruments, brass instruments, woodwind instruments, percussion instruments, and vocals. In some embodiments, pieces of music having variable tempos, rhythms, and beats can be learned with more ease due to the manually created and variable metronome function, as well as the manually created audio files having superior isolated instrument audio track quality. In some embodiments, songs are complicated and have changing or otherwise unisolatable beats that would be more difficult to learn without the teachings provided herein.

Figure 9:
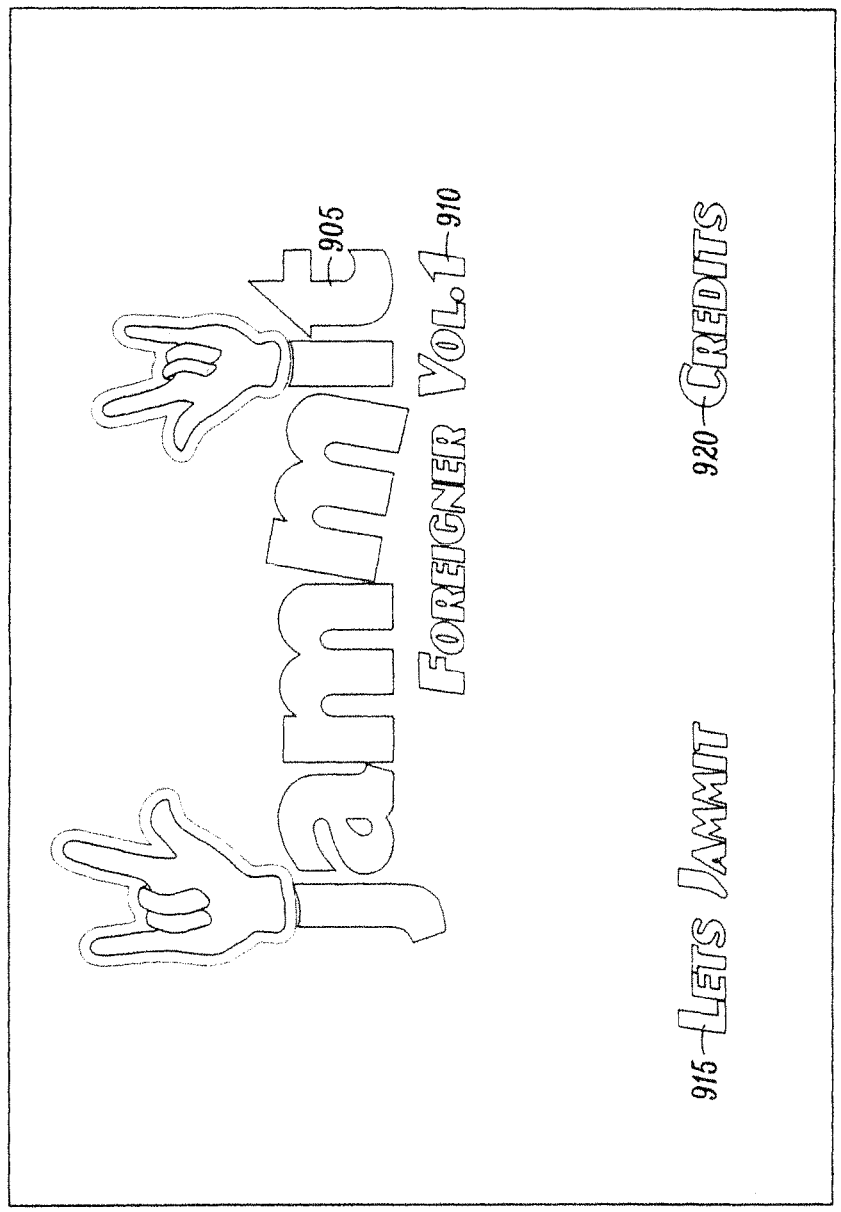
FIG. 9 illustrates a display for a graphical user interface identifying a multi-track audio recording set designed for use with the system for learning and mixing music, according to some embodiments.

Any of a variety of devices having any of a variety of graphical displays can be used. And, the graphical displays can have click and slide functions for state selectors, for example, rather than knobs or physical state selectors, such displays are depicted in FIGS. 9-18. FIG. 9 illustrates a display for a graphical user interface identifying a multi-track audio recording set designed for use with the system for learning and mixing music, according to some embodiments. Display 900 represents the opening page of a multi-track digital audio file produced from a multi-track audio recording for use with the teachings provided herein. Trademark 905 labels the source of the audio file, the title 910 shows the user what music is contained in the audio file, selection 915 is a function that takes the user to the next page in the graphical display, and credits 920 give proper attribution to producers, developers, and owners of the audio file.

Figure 10:
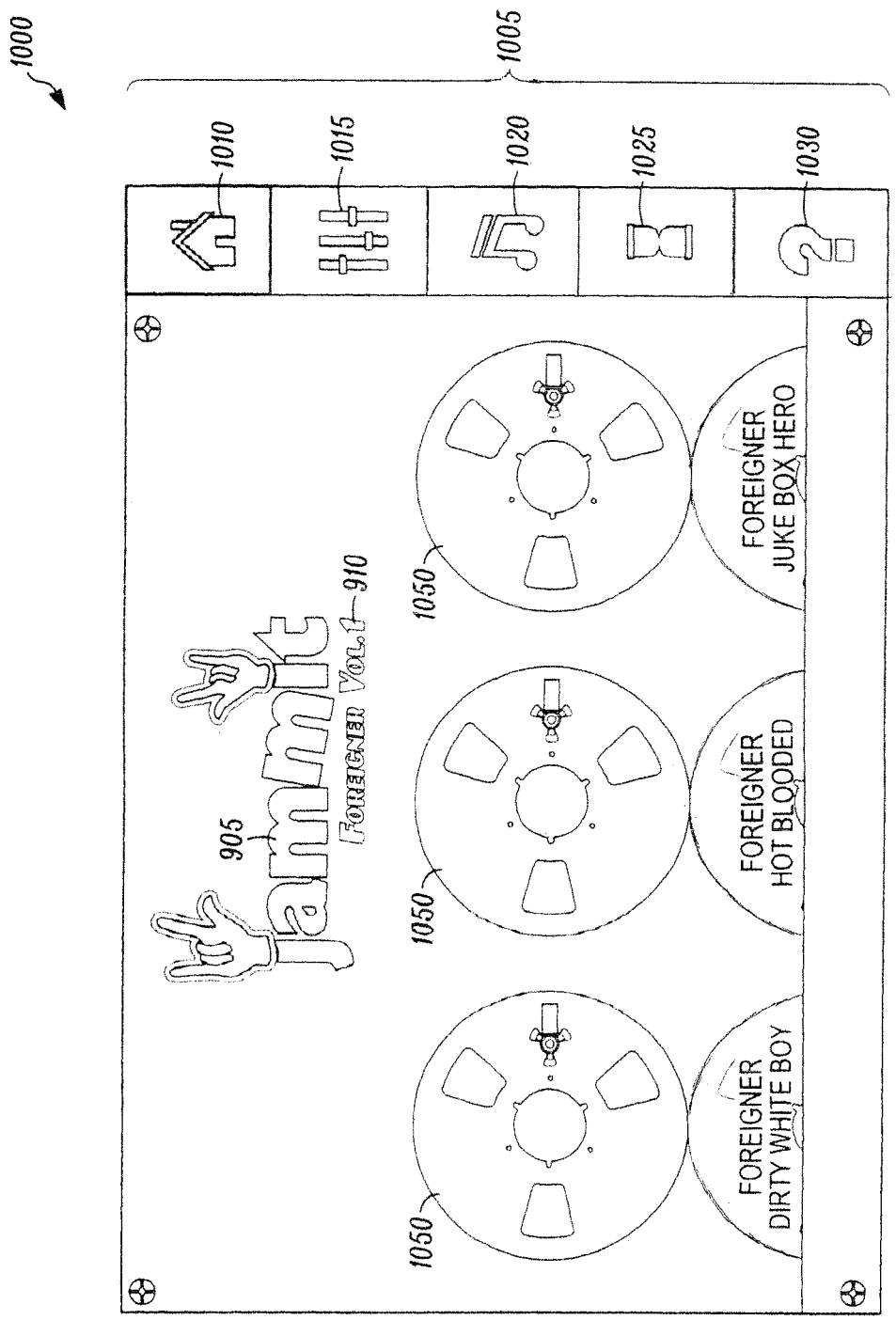
FIG. 10 illustrates a display for a graphical user interface offering selections within a track list of a multi-track audio recording set designed for use with the system for learning and mixing music, according to some embodiments.

The user will often have a set of multi-track digital audio files to learn on the system. FIG. 10 illustrates a display for a graphical user interface offering selections within a track list of a multi-track audio recording set designed for use with the system for learning and mixing music, according to some embodiments. Track List Display 1000 shows the selections in a multi-track audio recording set or track list 1050. The user chooses an audio file and proceeds to the menu bar 1005 to select a function from home page 1010, volume/fader page 1015, music transcription and tablature 1020, looping page 1025, and help page 1030.

Figure 11:
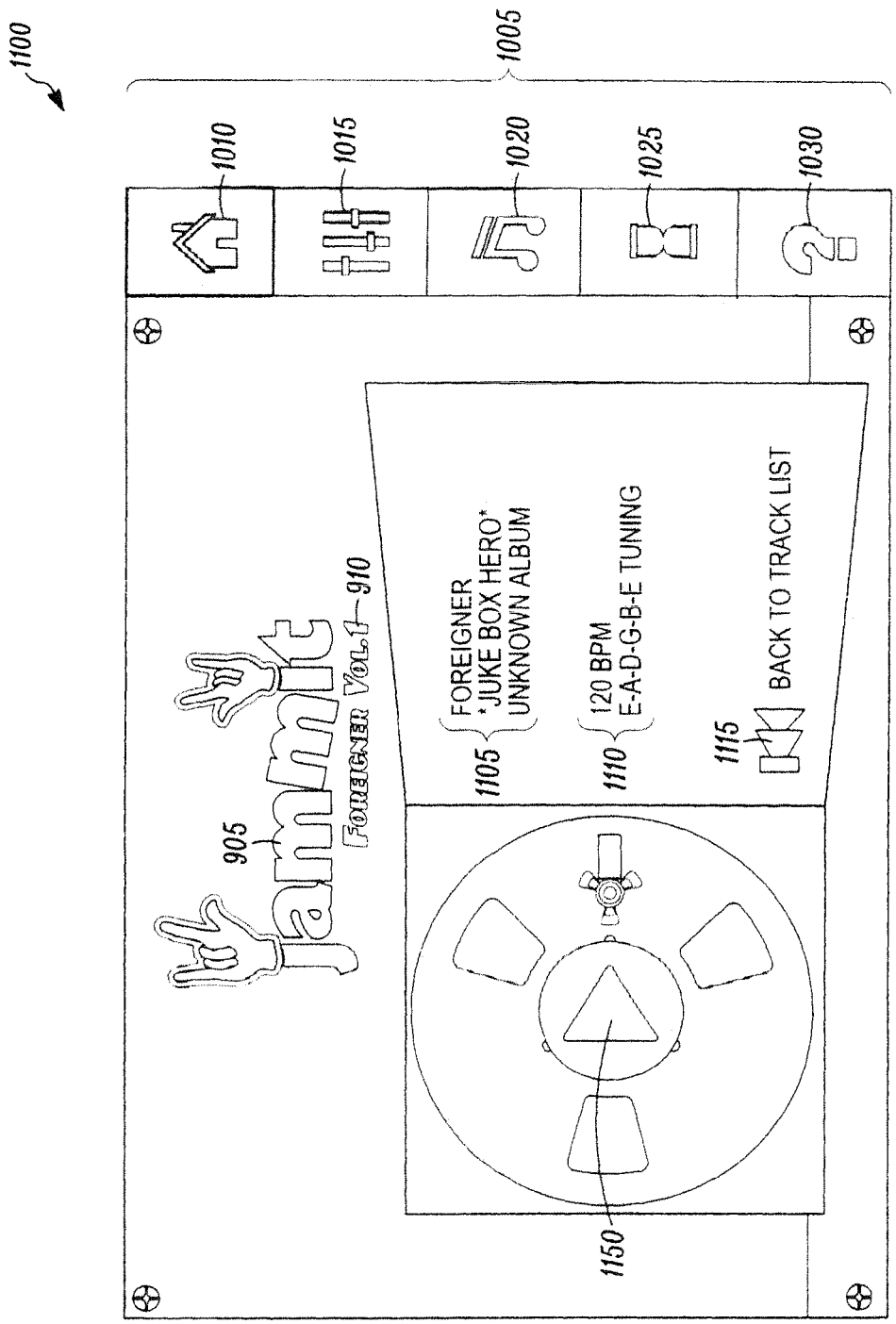
FIG. 11 illustrates a display for a graphical user interface offering information on the track list selection in the system for learning and mixing music, according to some embodiments.

The user can access an information page regarding the piece of music selected from the track list, such as the band, song title, album, tempo, and tuning. FIG. 11 illustrates a display for a graphical user interface offering information on the track list selection in the system for learning and mixing music, according to some embodiments. Information Display 1100 provides the user with the selection bibliographic information 1105 containing information on the band, song title, and album, and selection technical information 1110 provides information on the tempo and tuning for the selection. Play function 1150 allows the user to begin learning the selection.

Figure 12:
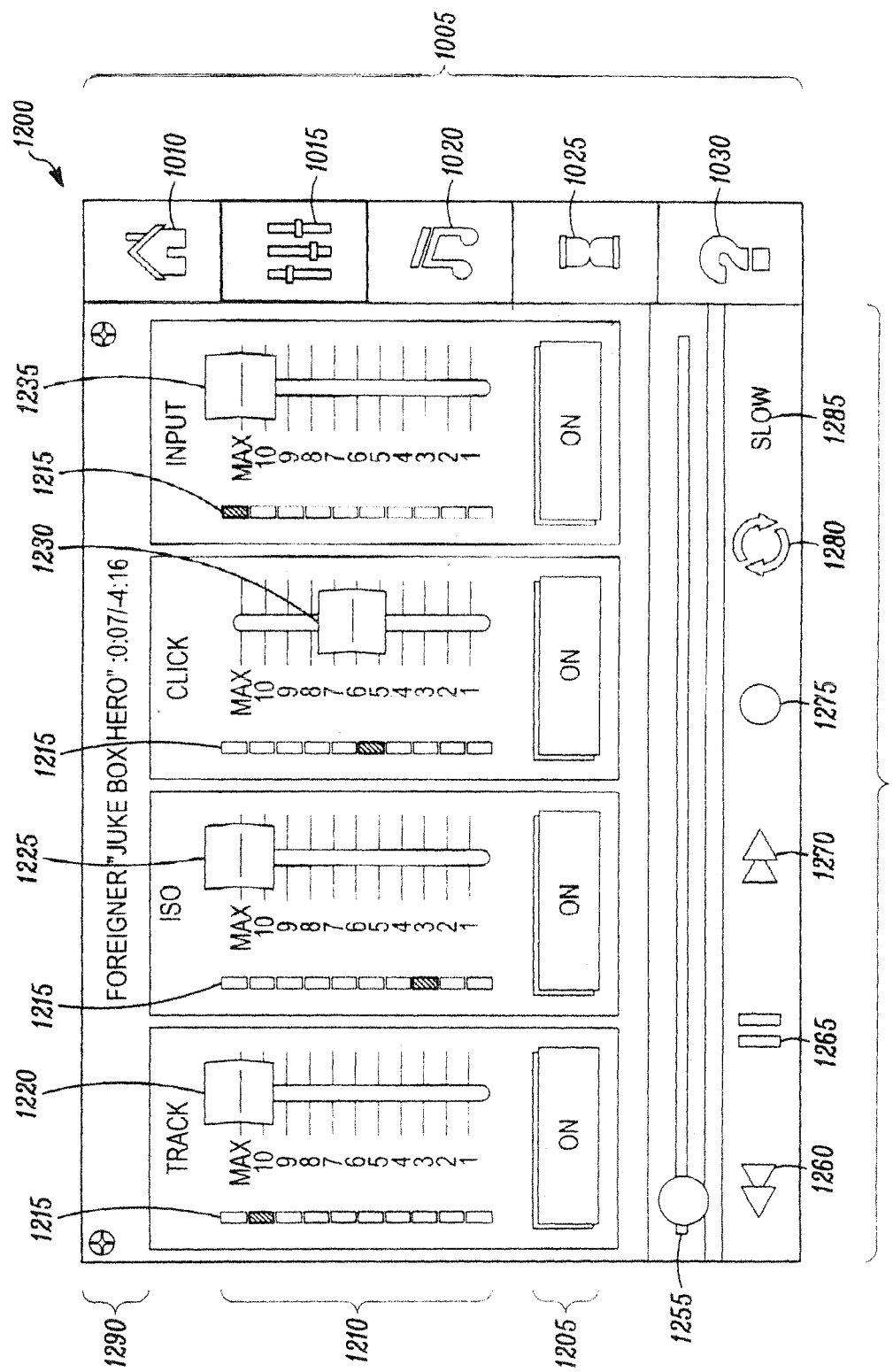
FIG. 12 illustrates a display for a graphical user interface offering state selections for track faders, volume fader control, and transport selections, in which all tracks are selected on a multi-track audio recording designed for use with the system for learning and mixing music, according to some embodiments.

The volume/fader page 1015 has several functions that enables a user to effectively learn and mix music. FIGS. 12-15 show various functionalities of the volume/fader page 1015. FIG. 12 illustrates a display for a graphical user interface offering state selections for track faders, volume fader control, and transport selections, in which all tracks are selected on a multi-track audio recording designed for use with the system for learning and mixing music, according to some embodiments.

Volume/fader display 1200 provides the functionality of track on/off (i.e. mute) control 1205 for each track file. The functionality of the volume/fader controls 1210 is provided by the volume indicators 1215 to indicate sound pressure level and the faders 1220,1225,1230,1235 to adjust volume in the manner of a potentiometer or digitometer, for example. Transport section 1250 provides a time bar 1255 to indicate a position in the piece of music and can also contain markings, such as colors, to indicate the intro, pre-chorus, verse, solo, bridge, outro, chorus, and middle section, for example.

The transport section 1250 also provides several state selection functions: a rewind 1260, pause 1265, fast forward 1270, stop 1275 as normal transport control state settings; loop 1280 to allow a user to repeat a desired section of the piece of music; and slow 1285 to allow the user to slow the song by a predetermined amount and serve the user as a function commonly known as a speed control, tempo adjustment, or tempo control. In some embodiments, the slow 1285 function can be a default setting (e.g. to slow by some percentage, such as 50%, 75%, or the like) and, in some embodiments, the user can define a desired speed setting. As such, in some embodiments, the playback controls can be to those found on about any tape deck or video cassette recorder, such as "previous", "next", "play", "pause", and "record". And, in some embodiments the playback controls include a "looping" function to allow the user to loop a particular section or measure over and over again until the user is satisfied in the learning experience.

In some embodiments, the transport section 1250 can be operable within a single functioning section of a system, such as a single page of a software application. In some embodiments, the transport section 1250 can be operable within a plurality of functioning sections of a system, such as in a plurality of pages of a software application, such that the transporting can occur quickly at the choosing of the user without having to move from one section of the system to another section of the system. A music label and timer 1290 is also provided as a reference data point for the user.

In some embodiments, the mixing of audio can be handled on an individual sample per track basis. Each track can be represented individually, having to keep track of its own samples, duration, levels and peaks, gain, and time. Once each track can be initialized and loaded out of its file, and then handed off to a subsystem to decode the compression and make samples. An example of a subsystem can include, for example Apple's COREAUDIO subsystem. After the samples are made available, the track can then be assigned to a master track handler object referred to as the mixer object, and saved recorded audio sessions can be loaded at this time as well. The mixer object primes the subsystem and initializes the output. In these embodiments, the touching of the "play" button can be used to start the mixer in its function of combining the audio within buffers, where the mixer calls out to each track asking it for its next frame of audio. The audio frames can be added to the playback buffer and enqueued, and all timing on the audio can then be synced to allow the audio to be synced to a subnote level to reduce or eliminate creep within tracks.

In some embodiments, the audio recording can be handled by a manner similar to the individual audio playback, where extensions to record to a file and store its place within a song can be used. Once the user clicks a record function, a recorder object can be built, and the object can then start a file and initialize the recording. Once initialized, the recording class can store the current play time within the song to the measure and begin. The user can tell the device to stop recording, and the object can then mark that time and store the duration of the data stream in a settings file. The audio data is then flushed to the file, a track handler object can then be created with its start time and duration set, and the mixer can be updated to allow future playback of the recorded audio along with the rest of the prerecorded audio.

Figure 13:
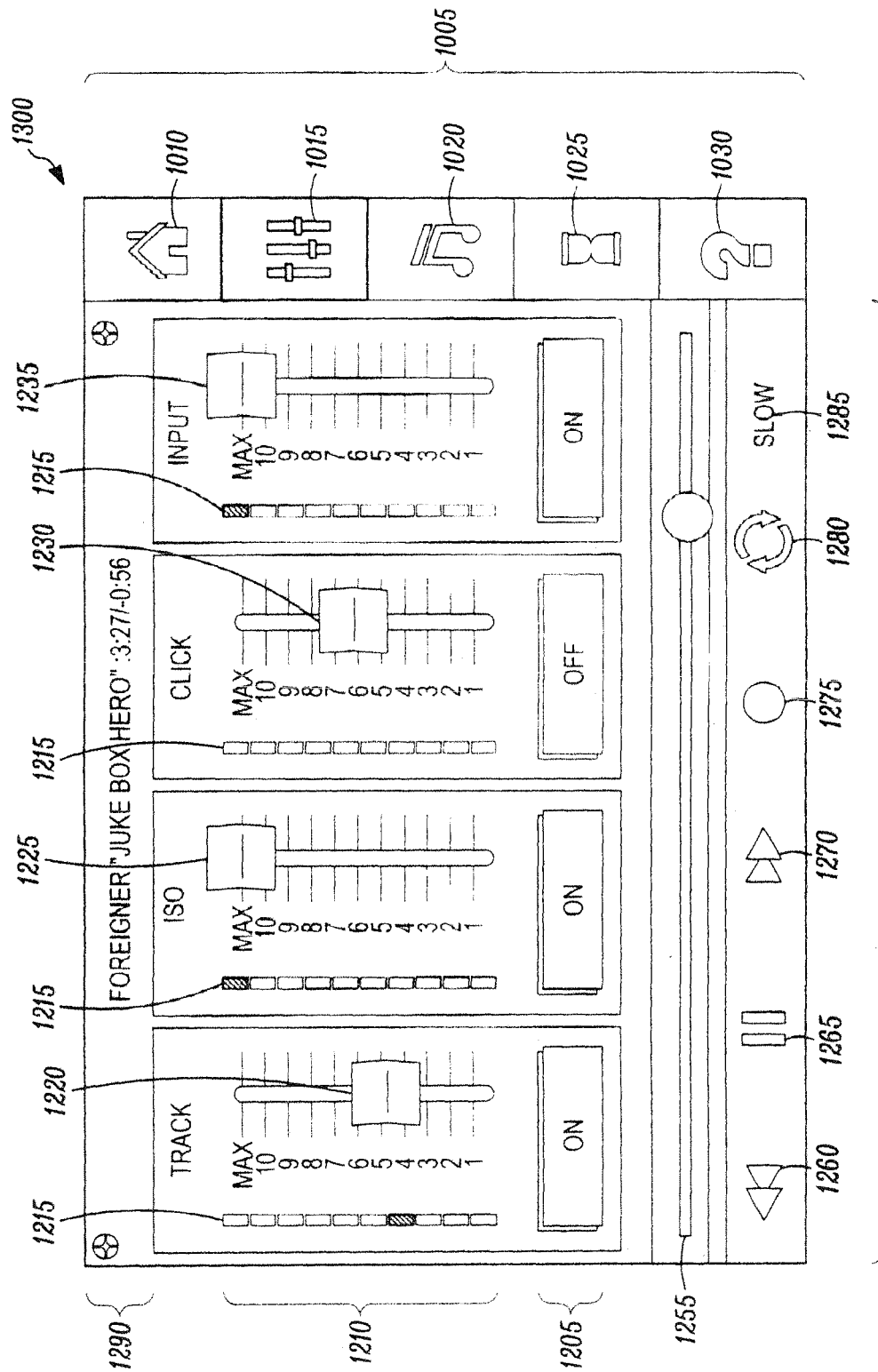
FIG. 13 illustrates a display for a graphical user interface offering state selections for track faders, volume fader control, and transport selections, in which all tracks but the metronome track are selected on a multi-track audio recording designed for use with the system for learning and mixing music, according to some embodiments.
Figure 14:
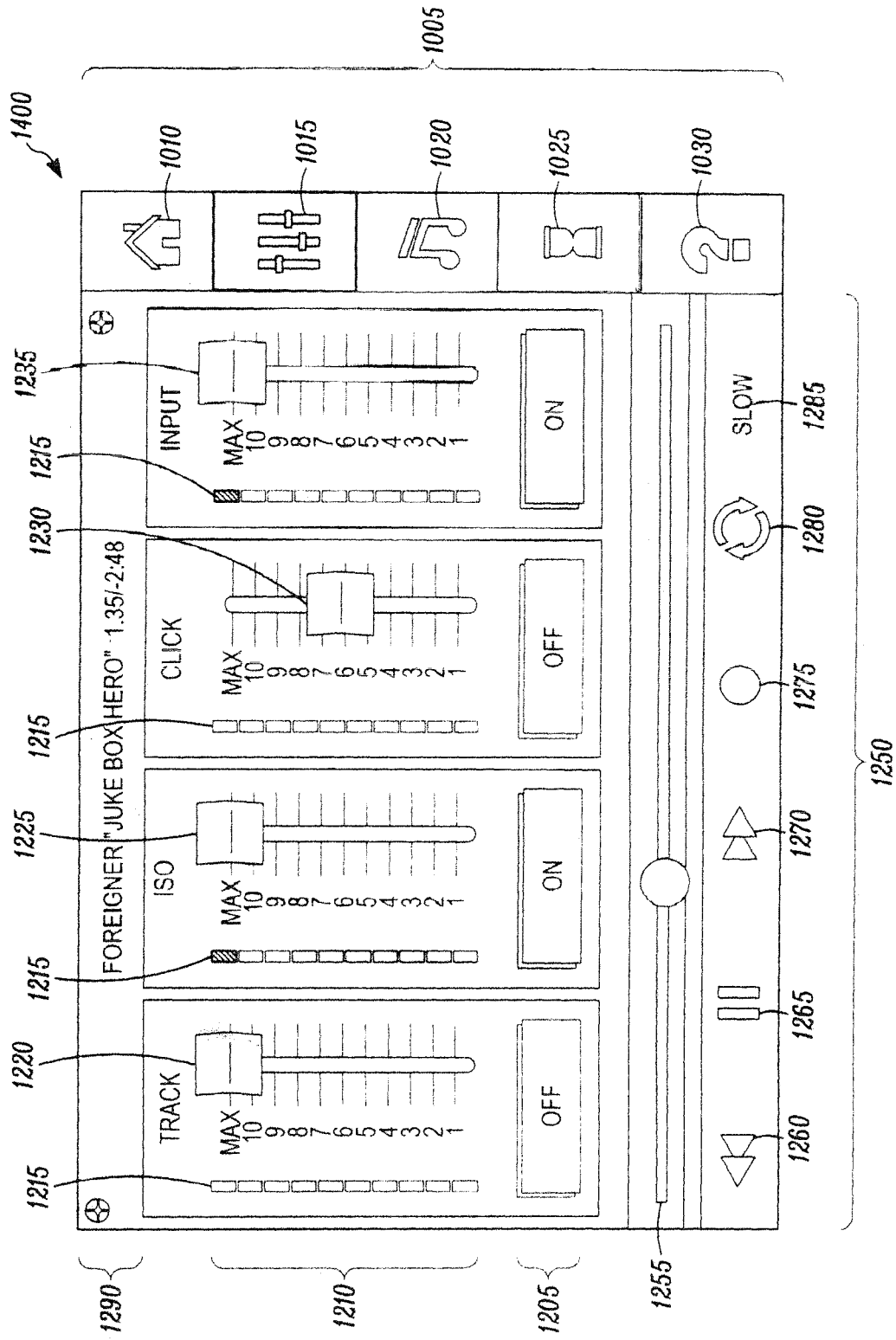
FIG. 14 illustrates a display for a graphical user interface offering state selections for track faders, volume fader control, and transport selections, in which only the isolated instrument audio track and the emulated instrument audio track are selected on a multi-track audio recording designed for use with the system for learning and mixing music, according to some embodiments.
Figure 15:
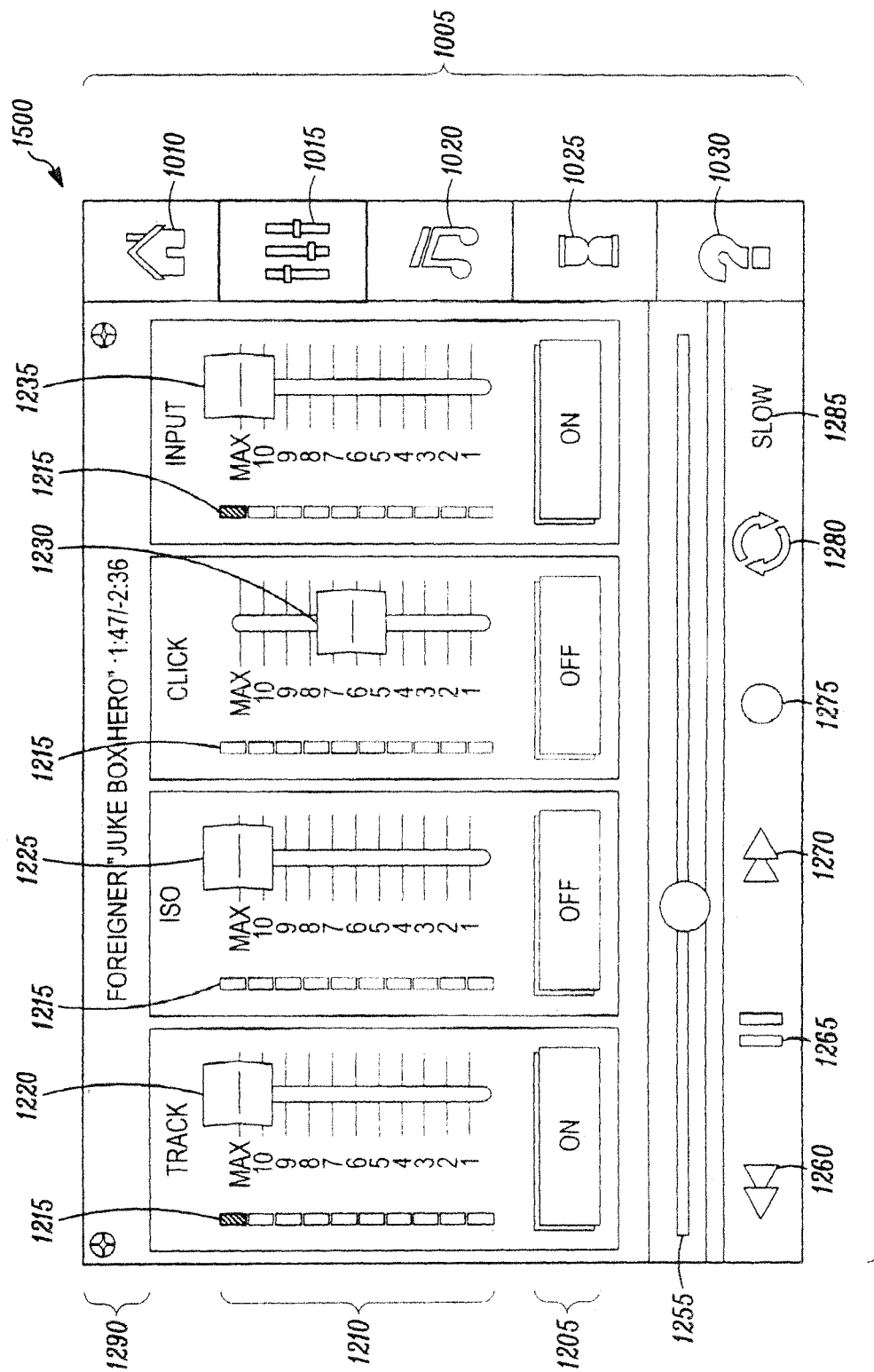
FIG. 15 illustrates a display for a graphical user interface offering state selections for track faders, volume fader control, and transport selections, in which only the emulation audio track and the emulated instrument audio track are selected on a multi-track audio recording designed for use with the system for learning and mixing music, according to some embodiments.

FIG. 13 illustrates a display for a graphical user interface offering state selections for track faders, volume fader control, and transport selections, in which all tracks but the metronome track are selected on a multi-track audio recording designed for use with the system for learning and mixing music, according to some embodiments. FIG. 14 illustrates a display for a graphical user interface offering state selections for track faders, volume fader control, and transport selections, in which only the isolated instrument audio track and the emulated instrument audio track are selected on a multi-track audio recording designed for use with the system for learning and mixing music, according to some embodiments. FIG. 15 illustrates a display for a graphical user interface offering state selections for track faders, volume fader control, and transport selections, in which only the emulation audio track and the emulated instrument audio track are selected on a multi-track audio recording designed for use with the system for learning and mixing music, according to some embodiments.

Figure 16:
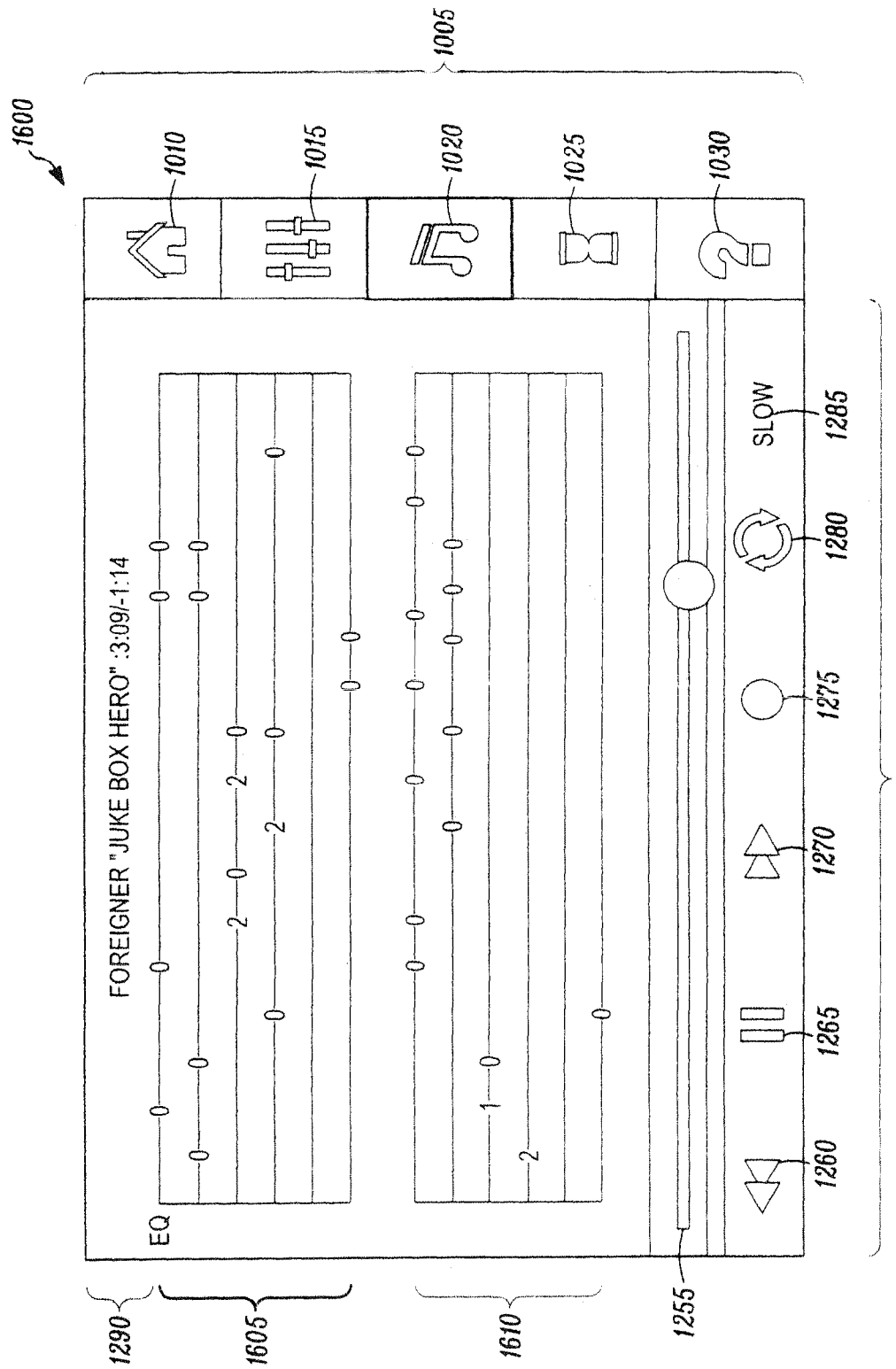
FIG. 16 illustrates a display for a graphical user interface offering musical transcription and tablature audio data, in which only the current section of music is shown for a multi-track audio recording designed for use with the system for learning and mixing music, according to some embodiments.

A user can benefit by reading music while playing. FIG. 16 illustrates a display for a graphical user interface offering musical transcription and tablature audio data, in which only the current section of music is shown for a multi-track audio recording designed for use with the system for learning and mixing music, according to some embodiments. Music transcription and tablature page 1600 provides the current transcription and tablature 1605 in a bright display and the upcoming transcription and tablature 1610 in a dim display, where the current represents the music currently playing, and the upcoming represents the music immediately following the music currently playing. Each measure, for example, can have a timecode and duration that represents where in the song's timeline that measure is played. Using that information along with the song's current playback position, the tablature can be synchronized wlong with any playing audio. Each measure can be designed to display notes or chords and which strings or frets to use. In some embodiments, a user may desire a standard music scale for display. The musical transcription and tablature can also be a dynamic, scrolling display, in some embodiments.

Figure 17:
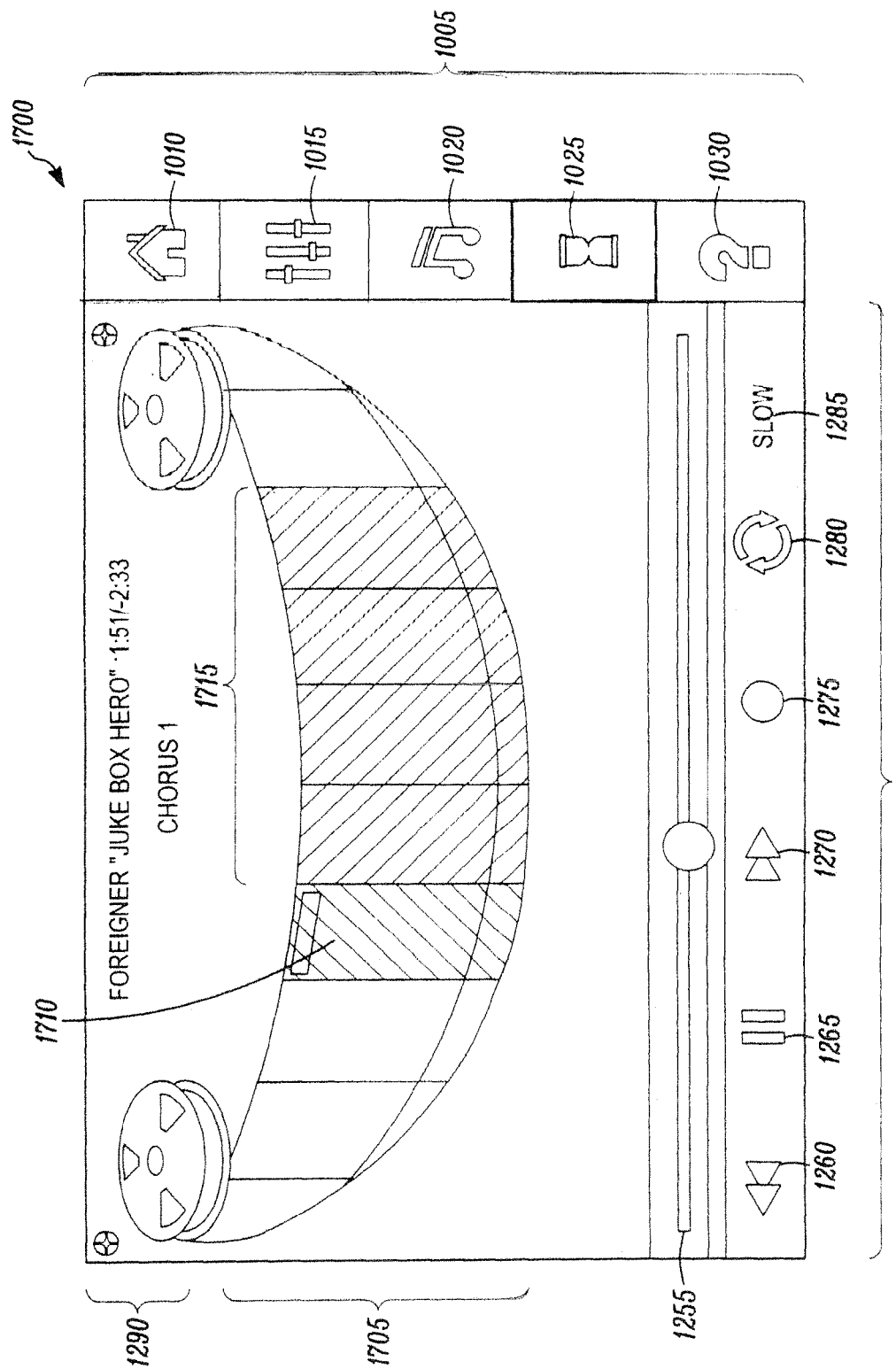
FIG. 17 illustrates a display for a graphical user interface offering selection of a section of a piece of music by bar or set of bars in a multi-track audio recording designed for use with the system for learning and mixing music, according to some embodiments.

A user can also benefit from a function that allows for an isolation of a particular section of a piece of music, as well as a looping of that section to enable the user to focus and practice on that section of the music. FIG. 17 illustrates a display for a graphical user interface offering selection of a section of a piece of music by bar or set of bars in a multi-track audio recording designed for use with the system for learning and mixing music, according to some embodiments. Looping page 1700 displays section 1705 of the digital audio file, and bar 1710 or bars 1715, for example, can be isolated and selected for playback by the user. The user can then use the methods taught herein to focus and learn the particular section 1705, bar 1710, or bars 1715, for example. As such, in some embodiments, the playback can also be controlled through a "reel screen", where every measure is segmented. In such embodiments, any audio the user has recorded can also be displayed on the screen in the measures in which it exists to allow the user to quickly find that audio and listen to their play of that session as graphed over the original audio data. In some embodiments, a "tape" can be graphically displayed to show the markings of the playback tracking bar.

Figure 18:
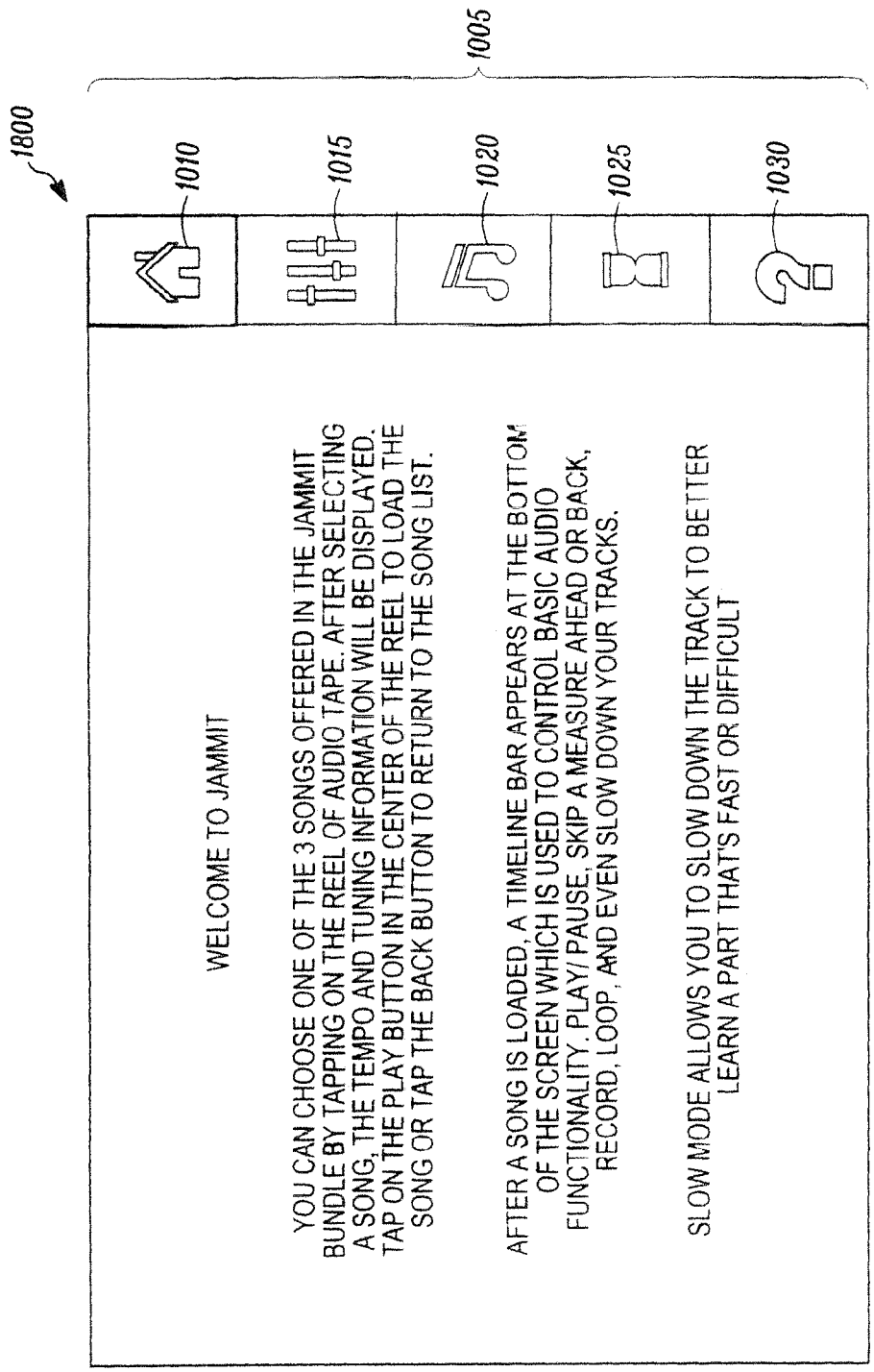
FIG. 18 illustrates a display for a graphical user interface offering a help page for the system for learning and mixing music, according to some embodiments.

The user may have questions, and as such, a help page is always useful. FIG. 18 illustrates a display for a graphical user interface offering a help page for the system for learning and mixing music, according to some embodiments. Help page 1800 is a simple depiction of information that a user can obtain from the system.

Figure 19:
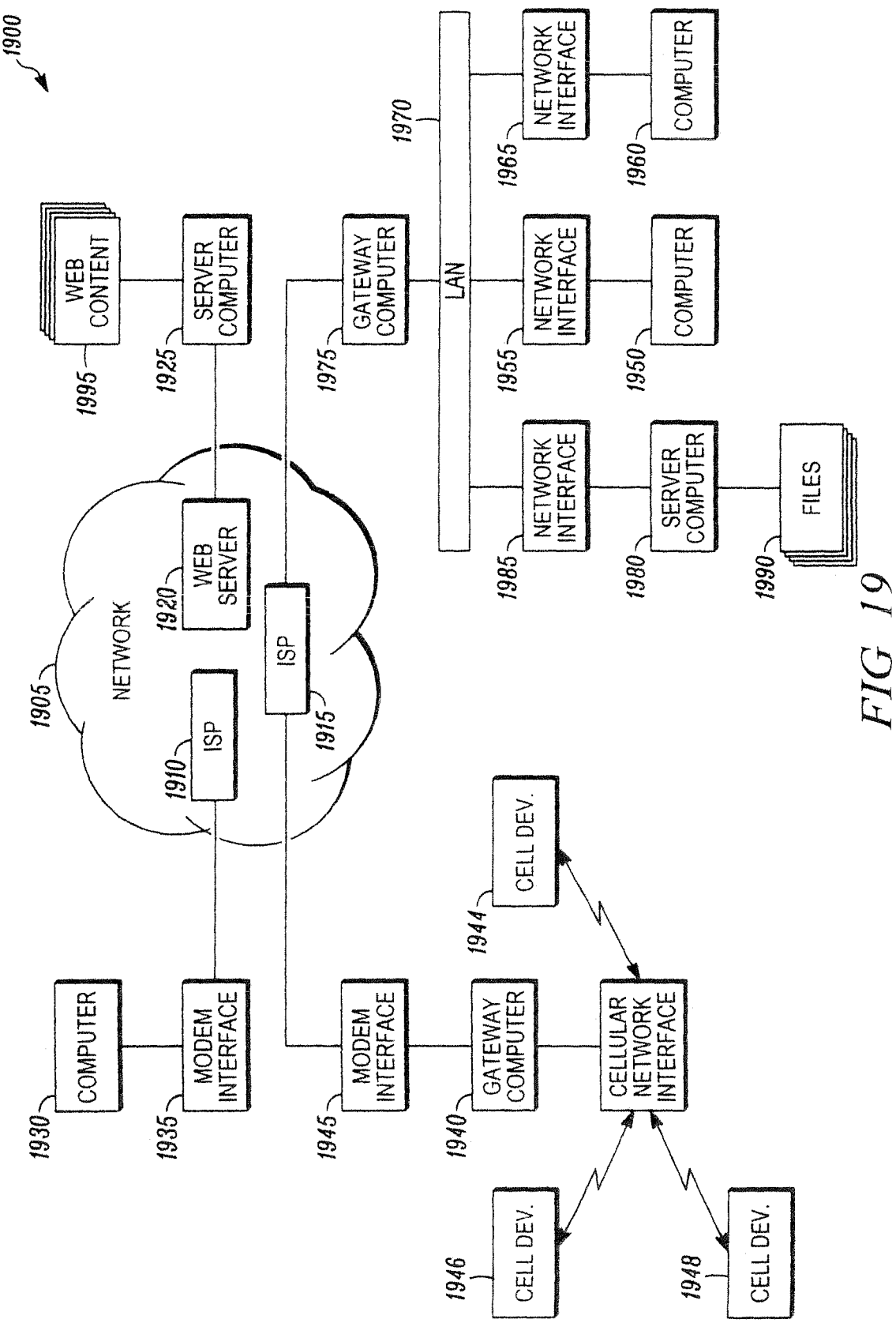
FIG. 19 shows how a network may be used for the system for learning and mixing music, according to some embodiments.

FIG. 19 shows how a network may be used for the system for learning and mixing music, according to some embodiments. FIG. 19 shows several computer systems coupled together through a network 1905, such as the internet, along with a cellular network and related cellular devices. The term "internet" as used herein refers to a network of networks which uses certain protocols, such as the TCP/IP protocol, and possibly other protocols such as the hypertext transfer protocol (HTTP) for hypertext markup language (HTML) documents that make up the world wide web (web). The physical connections of the internet and the protocols and communication procedures of the internet are well known to those of skill in the art.

Access to the internet 1905 is typically provided by internet service providers (ISP), such as the ISPs 1910 and 1915. Users on client systems, such as client computer systems 1930, 1950, and 1960 obtain access to the internet through the internet service providers, such as ISPs 1910 and 1915. Access to the internet allows users of the client computer systems to exchange information, receive and send e-mails, and view documents, such as documents which have been prepared in the HTML format. These documents are often provided by web servers, such as web server 1920 which is considered to be "on" the internet. Often these web servers are provided by the ISPs, such as ISP 1910, although a computer system can be set up and connected to the internet without that system also being an ISP.

The web server 1920 is typically at least one computer system which operates as a server computer system and is configured to operate with the protocols of the world wide web and is coupled to the internet. Optionally, the web server 1920 can be part of an ISP which provides access to the internet for client systems. The web server 1920 is shown coupled to the server computer system 1925 which itself is coupled to web content 1995, which can be considered a form of a media database. While two computer systems 1920 and 1925 are shown in FIG. 19, the web server system 1920 and the server computer system 1925 can be one computer system having different software components providing the web server functionality and the server functionality provided by the server computer system 1925 which will be described further below.

Cellular network interface 1943 provides an interface between a cellular network and corresponding cellular devices 1944, 1946 and 1948 on one side, and network 1905 on the other side. Thus cellular devices 1944, 1946 and 1948, which may be personal devices including cellular telephones, two-way pagers, personal digital assistants or other similar devices, may connect with network 1905 and exchange information such as email, content, or HTTP-formatted data, for example. Cellular network interface 1943 is coupled to computer 1940, which communicates with network 1905 through modem interface 1945. Computer 1940 may be a personal computer, server computer or the like, and serves as a gateway. Thus, computer 1940 may be similar to client computers 1950 and 1960 or to gateway computer 1975, for example. Software or content may then be uploaded or downloaded through the connection provided by interface 1943, computer 1940 and modem 1945.

Client computer systems 1930, 1950, and 1960 can each, with the appropriate web browsing software, view HTML pages provided by the web server 1920. The ISP 1910 provides internet connectivity to the client computer system 1930 through the modem interface 1935 which can be considered part of the client computer system 1930. The client computer system can be a personal computer system, a network computer, a web TV system, or other such computer system.

Similarly, the ISP 1915 provides internet connectivity for client systems 1950 and 1960, although as shown in FIG. 19, the connections are not the same as for more directly connected computer systems. Client computer systems 1950 and 1960 are part of a LAN coupled through a gateway computer 1975. While FIG. 19 shows the interfaces 1935 and 1945 as generically as a "modem," each of these interfaces can be an analog modem, isdn modem, cable modem, satellite transmission interface (e.g. "direct PC"), or other interfaces for coupling a computer system to other computer systems.

Client computer systems 1950 and 1960 are coupled to a LAN 1970 through network interfaces 1955 and 1965, which can be ethernet network or other network interfaces. The LAN 1970 is also coupled to a gateway computer system 1975 which can provide firewall and other internet related services for the local area network. This gateway computer system 1975 is coupled to the ISP 1915 to provide internet connectivity to the client computer systems 1950 and 1960. The gateway computer system 1975 can be a conventional server computer system. Also, the web server system 1920 can be a conventional server computer system.

Alternatively, a server computer system 1980 can be directly coupled to the LAN 1970 through a network interface 1985 to provide files 1990 and other services to the clients 1950, 1960, without the need to connect to the internet through the gateway system 1975.

Through the use of such a network, for example, the system can also provide an element of social networking, whereby users can contact other users having similar subject-profiles. In some embodiments, the system can include a messaging module operable to deliver notifications via email, SMS, and other mediums. In some embodiments, the system is accessible through a portable, single unit device and, in some embodiments, the input device, the graphical user interface, or both, is provided through a portable, single unit device. In some embodiments, the portable, single unit device is a hand-held device.

Regardless of the information presented, the system exemplifies the broader concept of a system for learning and mixing music. The system can provide a powerful and unique learning experience and, in some embodiments, it can process multimedia in the form of text, images, video, and sound.

In some embodiments, the user can customize the system, such as choosing interfaces, colors, language, music preferences and categories, etc. The user is allowed to enter preferences into the system in order to customize visual displays that present the information the user in a personalized way. In some embodiments, the system includes a multimedia interaction of one or more of text and video; sound and diagrams, pictures, or images; sound; and video.

In some embodiments, the system and it's database can include any of a variety of system libraries that contain organized sets of any of a variety of information of value to users. Moreover, can information can be obtained from external data sources, whereby plug-ins and APIs can be designed to allow integration with third party systems and exchange data with external data sources. The external data sources can be used to provide information on demand, to update existing information stored in the system libraries, or both.

Some portions of the detailed description are presented in terms of operations of the system. The operations are those requiring physical manipulations of physical quantities resulting in a useful product being produced. In other words, a transformation is occurring, in some embodiments. In some embodiments, the transformation can be particular to the use of a particular machine or apparatus designed for that transformation. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. All of these and similar terms are to be associated with the appropriate physical quantities and are merely convenient labels applied to these quantities. Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Moreover, the teachings relate to a system for performing the operations herein. This system may be specially constructed as an apparatus designed solely for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

It should be also appreciated that, in some embodiments, the methods and displays presented herein are not necessarily inherently related to any particular computer or other apparatus. Various general purpose systems may be used with programs in accordance with the teachings herein, or it may prove convenient to construct more specialized apparatus to perform the methods of some embodiments. The required structure for a variety of these systems will be apparent to one of skill given the teachings herein. In addition, the techniques are not described with reference to any particular programming language, and various embodiments may thus be implemented using a variety of programming languages. Accordingly, the terms and examples provided above are illustrative only and not intended to be limiting; and, the term "embodiment," as used herein, means an embodiment that serves to illustrate by way of example and not limitation. The following examples are illustrative of the uses of the present invention. It should be appreciated that the examples are for purposes of illustration and are not to be construed as limiting to the invention.

Example 1

In one aspect, a movie digital file is synchronized with and optionally attached in the data structure with the audio tracks, such as for recorded musical notation or any video that is played on a screen in time with the audio components. Another option is the inclusion of a music XML file is possible such as for playing musical notation if desired or otherwise providing instructions for the playback of the work.

In a further embodiment, a graphical representation is stored in a device that reproduces the musical notation of the part to be learned, and a visual display presents such musical notation in synchronism with the audio. Preferably, the visual display provides a scrolling graphical representation, in which the musical notation is moved axially, or scrolled, along the display over time. A graphical marker in the display area indicates the present moment and the scrolling movement enables a player to visualize the imminent notes to be played. Preferably, the display is configured to maximize the notation on the display of the music currently played, making it visible from a distance. At the same time, the amount of data visible at any one time is restricted to the data that are strictly relevant with respect to the part of the composition played at that particular time and at times that shortly precede and follow the part being played.

In another embodiment, a display shows a visual representation of the musical notes to be played, which may be synchronized with the audio playback so that the recent, present and imminent musical notes can be seen.

In one embodiment, a display provides an animated graphical representation of the musical notation relative to the part to be learned, whereby such graphical representation scrolls along the display area in synchronism with the audio music signal. In particular, a region of the display area is marked to identify the present moment, with the graphical representation of the music moving past the marks as the music part is being played. By this arrangement, the display area enables a player to see musical events in advance that are immediately following the present moment. In a variant of the present embodiment, recent musical notation elements may also be seen in retrospect.

The apparatus and methods of presenting musical notation are advantageous because a student is provided with a temporal context for the musical events of interest by presenting the notation in a linear form. Contrary to traditional sheet music notation, the scrolling of the music can be continuous, removing the need for page turns.

In another embodiment, apparatus and methods are also provided for annotating musical events within the graphical score to ensure a synchronization of the visual display with the audio musical output. This synchronization may be generated manually or automatically and involves associating one or more points in the graphical representation with the corresponding time at which they should be displayed. The display control system adjusts the presentation rate of the graphical data so that the visual representation is aligned with the audio signal at points where visual representation and audio signals have been associated previously. Alternatively, the rate of progress may be adjusted throughout the graphical representation to ensure that synchronization can be done in the production stage of the graphical material. In the latter case, any one of the known methods of graphical interpolation may be used to adjust the rate at which the graphical visualization proceeds, so that the processed version can be played back at a fixed rate but with the assurance of being aligned with the audio.

In order to ensure that displayed musical notation is synchronized with the audio, presentation time stamps can be encoded with the notation data, whether the notation is stored as a rendered video representation or as raw data requiring rendering to a visual form. The rate at which the visual notation is presented may be controlled by the device, so to ensure synchronism with the audio. In particular, the rate at which the visual notation is presented is adjusted on the basis of an estimated error between it and the audio at the current rate of presentation of each. If it is estimated that a point in the notation associated with a presentation time stamp will be presented after the corresponding point in the audio tracks, then the presentation rate for the notation is increased. Conversely, if the estimated presentation time for a time stamped point in the visual notation is early relative to the audio tracks, then the presentation rate for the notation can be slowed. The amount by which the presentation rate is adjusted can be derived from the degree of estimated presentation time error.

If synchronization of the graphical material is to be performed in a playback mode, the playback device must be able to advance through the graphical material at a variable rate. To this end, the frame rate for a video presentation may be changed (if the display mechanism can tolerate inconsistent frame durations) by interpolating new frames from the stored frames during playback, or by altering the rate of rendering of the graphical elements in a graphical representation, which—unlike video—during audio playback is rendered from a stored formalized representation.

Adjustments to the presentation rate to achieve synchronism are implemented by determining the timing error that will arise to the next marked graphical point at the current playback rate. Such determination may be performed through a dedicated component. If the next marked graphical point occurs late, the presentation rate is increased, or if it occurs early, the presentation rate is reduced. This error is assessed periodically and the presentation rate adjusted accordingly so that the actual timing error is minimal and unnoticeable. When a marked point is passed, the process continues using the next marked point or, in the absence of another mark, by using the end of the graphical presentation and the end of the audio recording. This arrangement is particularly advantageous because audio and visual synchronism are insured despite variations in the musical tempo, which frequently occur as an artifact of human performance and also as an artistic device within a composition.

A video file (for example, a MP4 movie file) is then attached and synchronized with the above described audio file. This video file may include, among other things, a video display of the musical notations or other visual instructions. A music XML file may also be attached and synchronized with the above described audio files, for example, to provide the musical notation.

The audio tracks may be encoded into a digital file format using a container method, in order to support several separate but synchronized audio channels. The RIFF file formats, such as way and avi are examples of this type of file. Additionally, since certain of these file formats are configured to allow more than one data type to be stored together, video or notation data may also be included. A single data file may then include all of the information required to play the audio, present the visual notation and to record user performances. Other relevant data may also be included, for example musical instrument digital interface (MIDI) data and lyrics.

I claim:

1. A synchronized audiovisual work, the work comprising:
    an audio data recording of an isolated audio track in a preselected piece of music having (i) a plurality of audio tracks, the audio data recording having variable tempos, rhythms, and beats; the audio data recording having an array of audio time samples that include (ii) an audio synchronization start time; (iii) an audio synchronization stop time; and, (iv) an audio duration in the array of audio time samples;
    a custom tempo map that is configured (i) to correspond with the variable tempos, rhythms, and beats of the audio data recording, and (ii) to include a mapping of the space between musical notes in the isolated audio track to determine the beats per minute of each bar of music in the isolated audio track for the preselected piece of music; and,
    a video data recording synchronized to the audio data recording; the video data recording having array of video time samples that include (ii) a video synchronization start time; (iii) a video synchronization stop time; and, (iv) an audio duration in the array of audio time samples; the video synchronization start time coincident in time with the audio synchronization start time, the video synchronization stop time coincident in time with the audio synchronization stop time, and the array of video time samples synchronized with the array of audio time samples for the duration of each using the custom tempo map to configure the synchronized audiovisual work;
    wherein,
    the audio data recording, the video data recording, and the custom tempo map are each stored on a non-transitory computer readable medium the audio data recording is synchronized to the video data recording by a processor with instructions for aligning the array of audio time samples with the array of video time samples, the synchronizing including assessing the synchronization of a video time sample in the array of video time samples to a corresponding audio time sample in the array of audio time samples to determine a timing error between the video time sample and the audio time sample using the custom tempo map; and, adjusting a video presentation rate measured between the video time sample and the next video time sample in the array of video time samples, such that the timing error is unnoticeable.

2. The work of claim 1, wherein the audio data of the isolated audio track comprises an originally recorded work.

3. The work of claim 1, wherein the audio data of the isolated audio track comprises a recreation of an originally recorded work.

4. The work of claim 1, wherein the work further includes instructions to use the tempo map for a looping of a selection of one or more bars to provide a repeated playback of a section of the preselected piece of music.

5. The work of claim 1, the video data including a looping notation display synchronized to a looping of a selection of one or more bars in the select track in the preselected piece of music.

6. The work of claim 1 including an animated graphical video display synchronized to the looping selection.

7. The work of claim 6, wherein the work includes a multi-track audio portion comprising an isolated audio track consisting of a solo performance.

8. The work of claim 6, wherein the work includes a plurality of recreated performances.

9. The work of claim 1, wherein the custom tempo map comprises an assignment of a transient in the isolated audio track having the fluctuation in tempos.

10. The work of claim 1, the preselected piece of music including vocals.

11. The work of claim 1, the preselected piece of music including a brass instrument.

12. The work of claim 1, the preselected piece of music including a woodwind instrument.

13. The work of claim 1, the preselected piece of music including a string instrument.

14. The work of claim 1, the preselected piece of music including a percussion instrument.

15. The work of claim 1, including a metronome track synchronized to the preselected piece of music.

16. The work of claim 1, the work further comprises instructions for the processor to vary a gain ratio in the preselected piece of music to selectively listen to one or more audio tracks within the multitrack file.

* * * * *